United States Patent
Halker et al.

(10) Patent No.: US 9,446,674 B2
(45) Date of Patent: Sep. 20, 2016

(54) SYSTEMS, METHODS, AND APPARATUS RELATED TO MUTUAL DETECTION AND IDENTIFICATION OF ELECTRIC VEHICLE AND CHARGING STATION

(71) Applicant: QUALCOMM Incorporated., San Diego, CA (US)

(72) Inventors: Ravi Halker, San Diego, CA (US); Manish Tripathi, San Diego, CA (US); Bernward Dimke, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/194,364

(22) Filed: Feb. 28, 2014

(65) Prior Publication Data
US 2015/0015419 A1    Jan. 15, 2015

Related U.S. Application Data

(60) Provisional application No. 61/846,192, filed on Jul. 15, 2013, provisional application No. 61/904,259, filed on Nov. 14, 2013.

(51) Int. Cl.
*B60L 11/18* (2006.01)
*H04L 29/08* (2006.01)

(52) U.S. Cl.
CPC .......... *B60L 11/182* (2013.01); *B60L 11/1827* (2013.01); *B60L 11/1829* (2013.01);
(Continued)

(58) Field of Classification Search
CPC .............. B60L 11/182; B60L 11/1827; B60L 11/1829; B60L 11/1838; B60L 11/1846; B60L 11/1848; B60L 11/18; G08B 21/00; G08B 21/02

USPC .............. 340/901, 636.1; 320/108, 109, 117, 320/118, 119, 120, 127, 128; 705/5, 35, 39, 705/65; 701/1, 22
See application file for complete search history.

(56) References Cited

U.S. PATENT DOCUMENTS

| 8,344,686 B2 | 1/2013 | Gaul et al. |
| 2011/0032110 A1 | 2/2011 | Taguchi |

(Continued)

FOREIGN PATENT DOCUMENTS

| EP | 2420401 A1 | 2/2012 |
| EP | 2500888 A1 | 9/2012 |

(Continued)

OTHER PUBLICATIONS

International Search Report and Written Opinion—PCT/US2014/045684—ISA/EPO—Mar. 3, 2015.

*Primary Examiner* — Hung T Nguyen
(74) *Attorney, Agent, or Firm* — Knobbe, Martens, Olson & Bear LLP

(57) ABSTRACT

Systems, methods, and apparatus are disclosed for communicating with a charging system comprising a plurality of charging stations configured to charge an electric vehicle. At least one first signal is transmitted to the charging system via a first communication link while the electric vehicle is a first distance from at least one charging station of the plurality of charging stations. The at least one first signal is indicative of a vehicle identifier of the electric vehicle. At least one second signal is received from the at least one charging station of the plurality of charging stations via a second communication link while the electric vehicle is a second distance from the at least one charging station, the second distance less than the first distance. The at least one second signal is indicative of a charging station identifier of the at least one charging station.

25 Claims, 20 Drawing Sheets

(52) U.S. Cl.
CPC ........ B60L11/1846 (2013.01); B60L 11/1848 (2013.01); *B60L 2240/627* (2013.01); *B60L 2250/20* (2013.01); *H04L 67/12* (2013.01); *Y02T 10/7005* (2013.01); *Y02T 10/7072* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2011/0181244 A1* | 7/2011 | Badger | 320/117 |
| 2012/0091956 A1* | 4/2012 | Hooker | B60L 11/1838 320/109 |
| 2012/0130891 A1* | 5/2012 | Bogaard | G07B 15/02 705/40 |
| 2012/0206098 A1* | 8/2012 | Kim | 320/108 |
| 2012/0233077 A1 | 9/2012 | Tate, Jr. et al. | |
| 2013/0132270 A1 | 5/2013 | Cheung et al. | |
| 2013/0193918 A1 | 8/2013 | Sarkar et al. | |
| 2013/0342310 A1* | 12/2013 | Park | B60L 3/12 340/5.7 |
| 2014/0028254 A1* | 1/2014 | Shane | H02J 3/14 320/109 |
| 2015/0015193 A1* | 1/2015 | Oman et al. | 320/108 |

FOREIGN PATENT DOCUMENTS

| | | |
|---|---|---|
| WO | WO-2012165243 A1 | 12/2012 |
| WO | WO-2013019989 A2 | 2/2013 |
| WO | WO-2013023164 A2 | 2/2013 |

* cited by examiner

SYSTEMS, METHODS, AND APPARATUS RELATED TO MUTUAL DETECTION AND IDENTIFICATION OF ELECTRIC VEHICLE AND CHARGING STATION

RELATED APPLICATIONS

This application claims the benefit of priority to U.S. Provisional Appl. No. 61/846,192, filed Jul. 15, 2013 and incorporated in its entirety by reference herein and U.S. Provisional Appl. No. 61/904,259, filed Nov. 14, 2013 and incorporated in its entirety by reference herein.

FIELD

The present disclosure relates generally to wireless power transfer, and more specifically to devices, systems, and methods related to wireless power transfer to remote systems such as vehicles including batteries and communications therebetween.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

In a parking facility with a plurality of charging stations available, an electric vehicle typically navigates within the parking facility to find a proper parking space for receiving charging from a charging station therein. An electric vehicle may attempt to pair with one or more charging stations within its communication range when a driver is attempting to use a wireless power charging facility with multiple charging pads. As such, wireless charging systems and methods that efficiently and effectively facilitate the identification of a charging station for a vehicle are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of communicating with a charging system comprising a plurality of charging stations configured to charge an electric vehicle. The method comprises transmitting at least one first signal to the charging system via a first communication link while the electric vehicle is a first distance from at least one charging station of the plurality of charging stations. The at least one first signal is indicative of a vehicle identifier of the electric vehicle. The method further comprises receiving at least one second signal from the at least one charging station of the plurality of charging stations via a second communication link while the electric vehicle is a second distance from the at least one charging station of the plurality of charging stations. The second distance is less than the first distance. The at least one second signal is indicative of a charging station identifier of the at least one charging station.

Another aspect of the subject matter described in the disclosure provides a method of communicating with an electric vehicle. The method comprises receiving at least one first signal from the electric vehicle via a first communication link while the electric vehicle is a first distance from at least one charging station of a charging system. The at least one first signal is indicative of a vehicle identifier of the electric vehicle. The method further comprises transmitting at least one second signal to the electric vehicle via a second communication link while the electric vehicle is a second distance from the at least one charging station of the charging system. The second distance is less than the first distance. The at least one second signal is indicative of an identifier of at least one charging station of a charging system.

Another aspect of the subject matter described in the disclosure provides a communication system of an electric vehicle, the communication system comprising a transmitter and a first receiver. The transmitter is configured to transmit at least one first signal to a charging system via a first communication link while the electric vehicle is a first distance from at least one charging station of a plurality of charging stations of the charging system. The at least one first signal is indicative of a vehicle identifier of the electric vehicle. The first receiver is configured to receive at least one second signal from the at least one charging station of the plurality of charging stations via a second communication link while the electric vehicle is a second distance from the at least one charging station. The second distance is less than the first distance. The at least one second signal is indicative of a charging station identifier of the at least one charging station.

Another aspect of the subject matter described in the disclosure provides a charging system comprising a receiver and a plurality of charging stations. The receiver is configured to receive at least one first signal from an electric vehicle via a first communication link while the electric vehicle is a first distance from at least one charging station of the charging system. The at least one first signal is indicative of a vehicle identifier of the electric vehicle. The plurality of charging stations comprises the at least one charging station and the plurality of charging stations is configured to charge the electric vehicle. Each charging station of the plurality of charging stations comprises a first transmitter configured to transmit at least one second signal via a second communication link while the electric vehicle is a second distance from the at least one charging station.

The second distance is less than the first distance. The at least one second signal is indicative of an identifier of the at least one charging station of the plurality of charging stations.

Another aspect of the subject matter described in the disclosure provides an apparatus for communicating with a charging system comprising a plurality of charging stations configured to charge an electric vehicle. The apparatus comprises means for transmitting at least one first signal to the charging system via a first communication link while the electric vehicle is a first distance from at least one charging station of the plurality of charging stations. The at least one first signal is indicative of a vehicle identifier of the electric vehicle. The apparatus further comprises means for receiving at least one second signal from the at least one charging station of the plurality of charging stations via a second communication link while the electric vehicle is a second distance from the at least one charging station. The second distance is less than the first distance. The at least one second signal is indicative of a charging station identifier of the at least one charging station.

Another aspect of the subject matter described in the disclosure provides an apparatus for communicating with an electric vehicle. The apparatus comprises means for receiving at least one first signal from the electric vehicle via a first communication link while the electric vehicle is a first distance from at least one charging station of a charging system. The at least one first signal is indicative of a vehicle identifier of the electric vehicle. The apparatus further comprises means for transmitting at least one second signal via a second communication link while the electric vehicle is a second distance from the at least one charging station of the charging system. The second distance is less than the first distance. The at least one second signal is indicative of an identifier of at least one charging station of a charging system.

Another aspect of the subject matter described in the disclosure provides a non-transitory computer-readable medium comprising code that, when executed, causes an apparatus to transmit at least one first signal to the charging system via a first communication link while an electric vehicle is a first distance from at least one charging station of a plurality of charging stations. The at least one first signal is indicative of a vehicle identifier of the electric vehicle. The code, when executed, further causes the apparatus to receive at least one second signal from the at least one charging station of the plurality of charging stations via a second communication link while the electric vehicle is a second distance from the at least one charging station. The second distance is less than the first distance. The at least one second signal is indicative of a charging station identifier of the at least one charging station.

Another aspect of the subject matter described in the disclosure provides a non-transitory computer-readable medium comprising code that, when executed, causes an apparatus to receive at least one first signal from an electric vehicle via a first communication link while the electric vehicle is a first distance from at least one charging station of a charging system. The at least one first signal is indicative of a vehicle identifier of the electric vehicle. The code, when executed, further causes the apparatus to transmit at least one second signal via a second communication link while the electric vehicle is a second distance from the at least one charging station. The second distance is less than the first distance. The at least one second signal is indicative of an identifier of the at least one charging station of the charging system.

Figure 1:
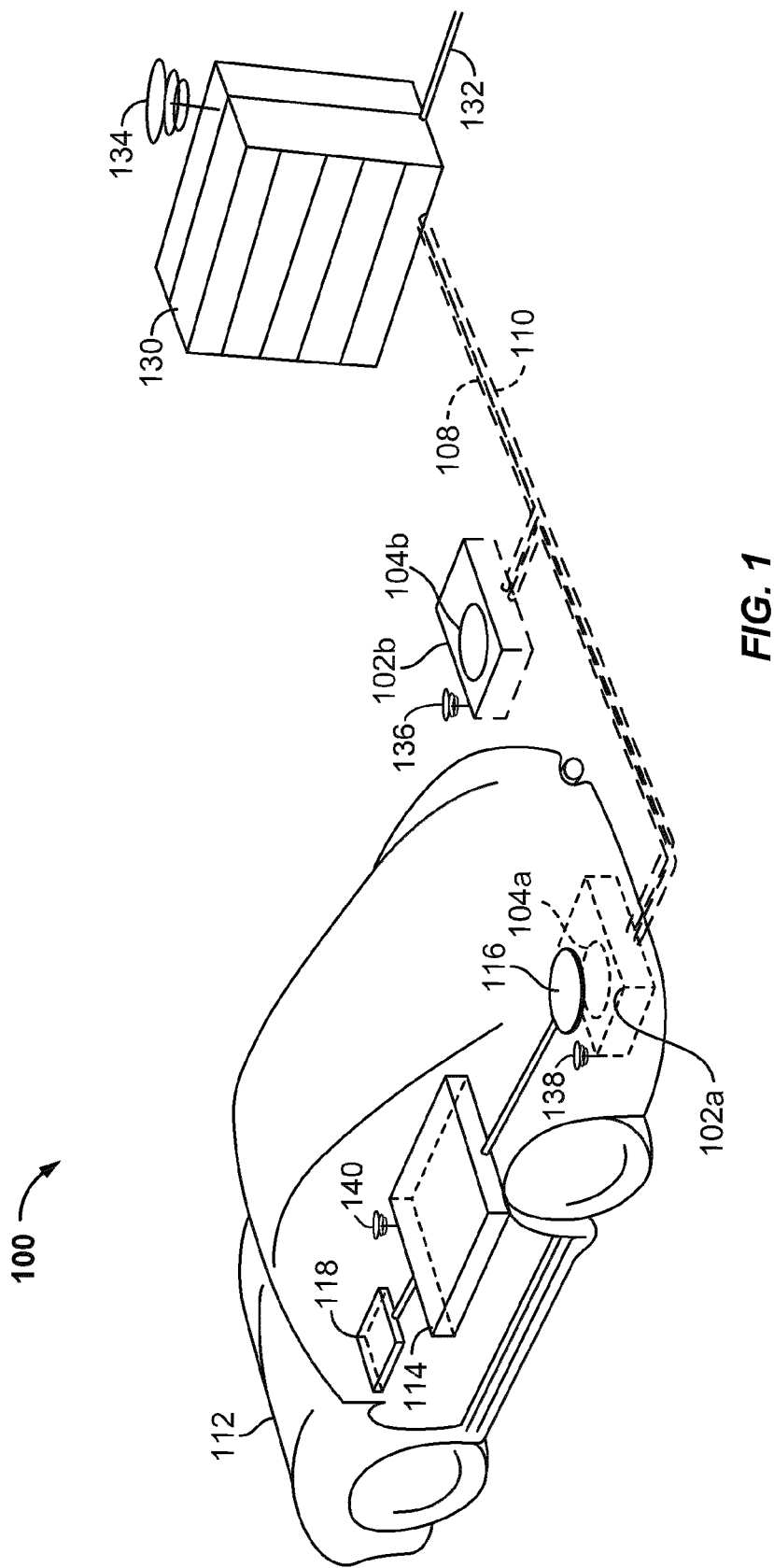
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The terms "first," "second," and "third" are used herein to distinguish among various elements (e.g., "first signal," "second signal," and "third signal") and are not intended to denote any particular order to these elements (e.g., are not intended to denote any particular order to the transmission of the first, second, or third signals or the reception of the first, second, or third signals). The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power and an antenna 136. An electric vehicle 112 may include a battery unit 118, an electric vehicle induction coil 116, an electric vehicle wireless charging system 114, and an antenna 140. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112 (e.g., to charge the battery unit 118). In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution center 130 may be configured to communicate with external sources (e.g., a power grid) via a communication backhaul 134, and with the base wireless charging system 102a via a communication link 108.

Base wireless charging systems 102a and 102b may be configured to communicate with the electric vehicle wireless charging system 114 via antennas 136 and 138. For example, the wireless charging system 102a may communicate with the electric vehicle wireless charging system 114 using a communication channel between antennas 138 and 140. The communication channels may be any type of communication channels such as, for example, Bluetooth, zigbee, cellular, wireless local area network (WLAN), etc.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
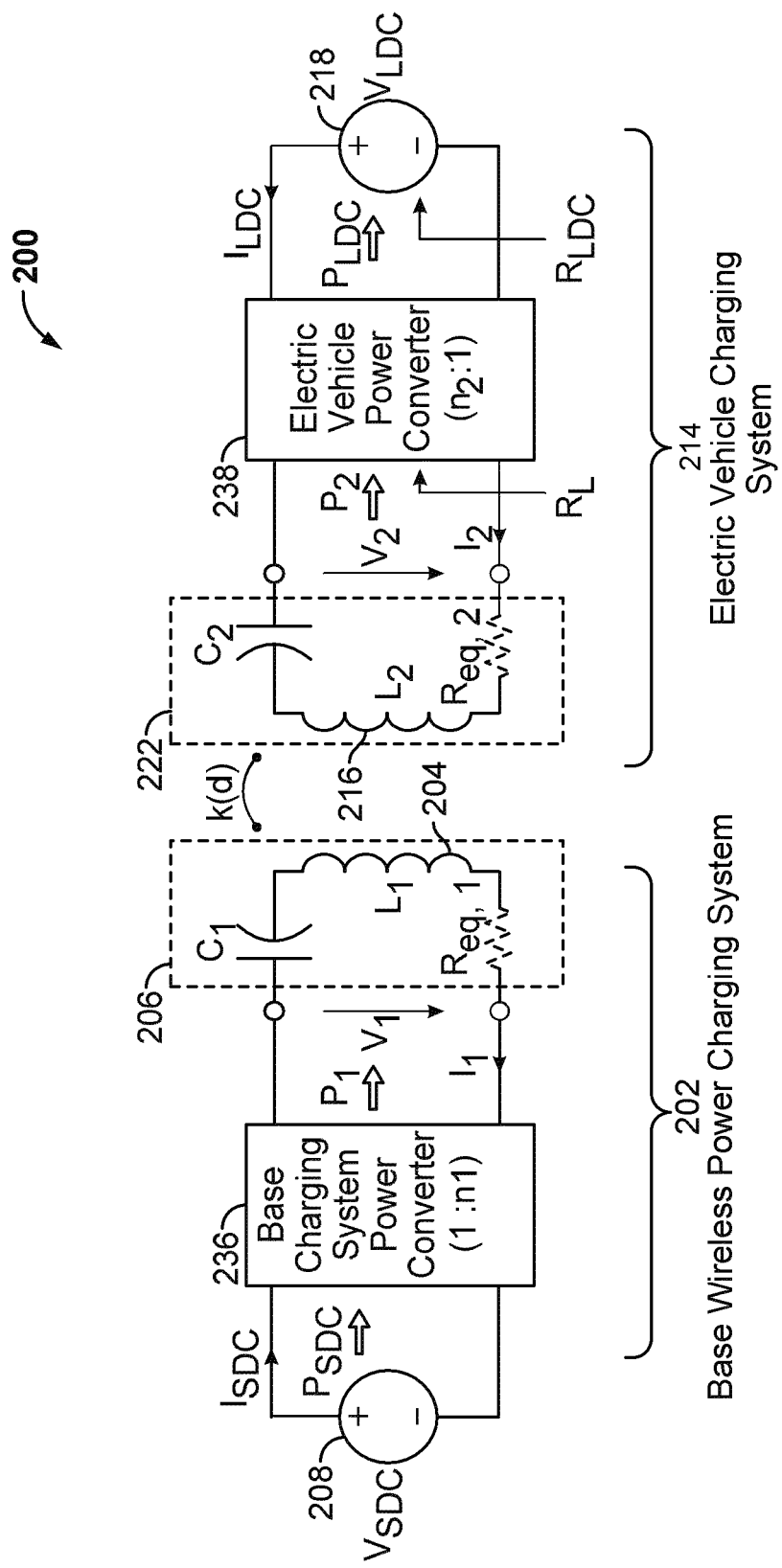
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
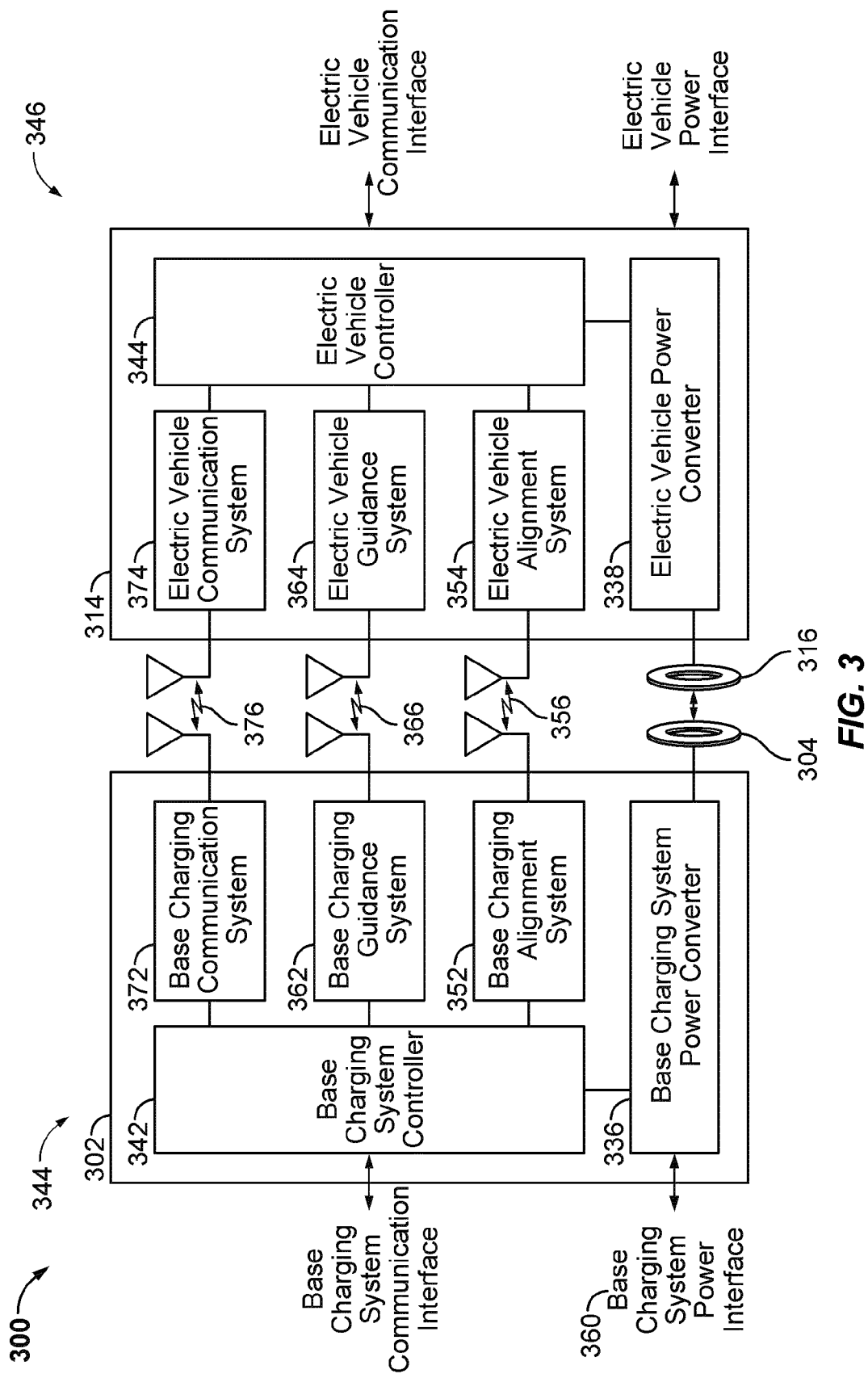
FIG. 3 is another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 may be configured to provide power to a charging system power converter 336 from a power source, such as an AC or DC power supply 126. The base charging system power converter 336 may receive AC or DC power from the base charging system power interface 360 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, a wireless device, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle induction coil 316. In addition, there may be separate general-purpose communication links (e.g., channels), such as communication link 376, supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels may be separate physical communication channels such as, for example, Dedicated Short-Range Communications (DSRC), IEEE 802.11 (e.g., WiFi), Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-added services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

The wireless power transfer system 100 described may be used with a variety of electric vehicles 102 including rechargeable or replaceable batteries.

Figure 4:
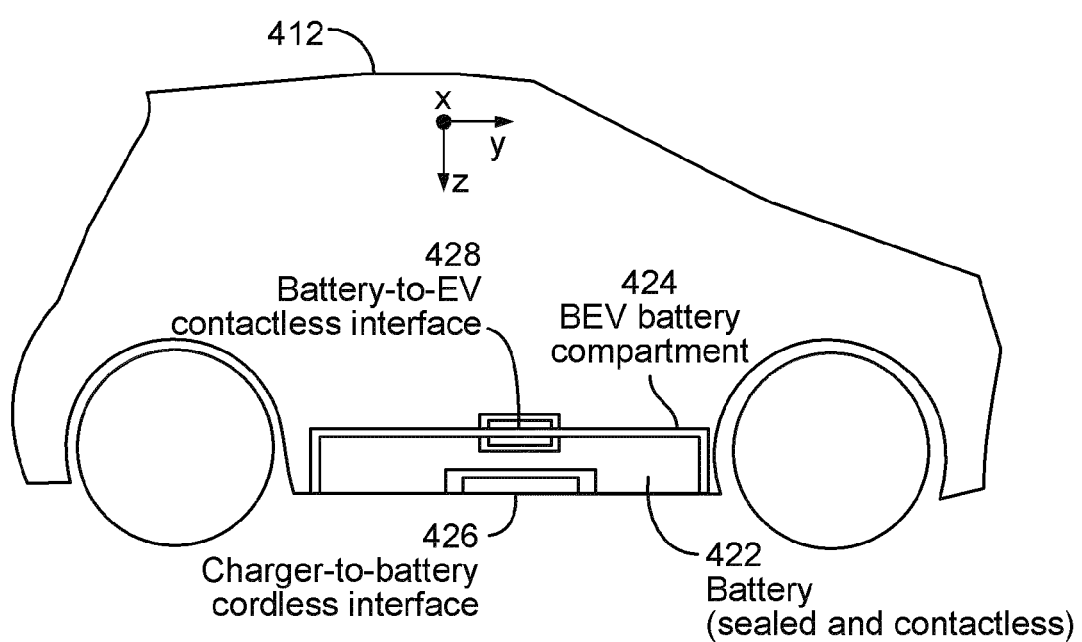
FIG. 4 is a functional block diagram showing a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
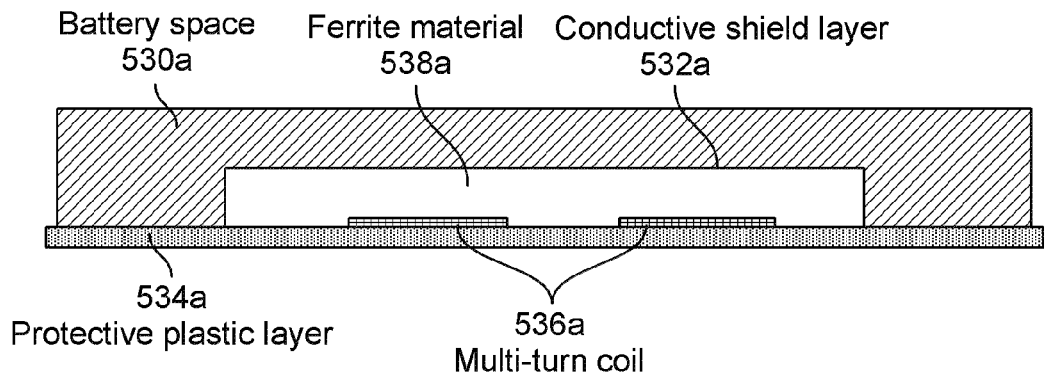
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield layer 532a may be provided to protect passengers of the vehicle from excessive EMF transmission. Conductive shielding may be particularly useful in vehicles made of plastic or composites.

Figure 5B:
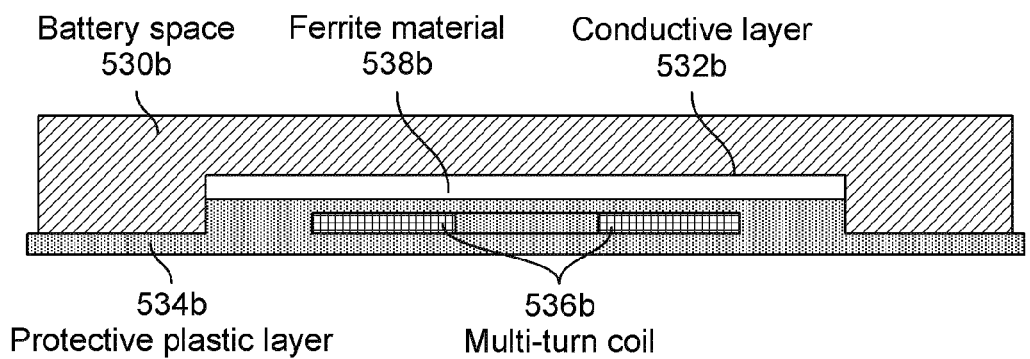

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
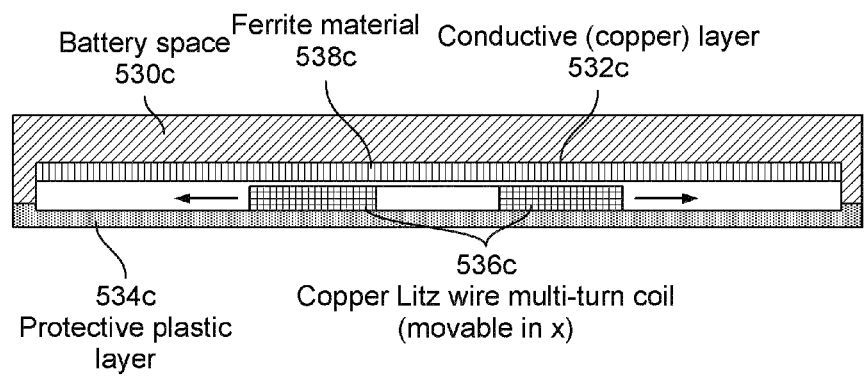
Figure 5D:
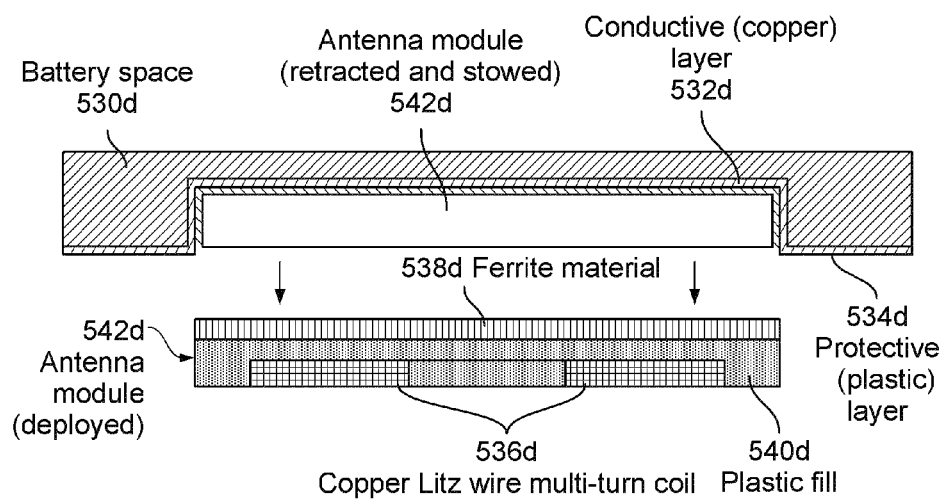

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 542d as part of the wireless power interface. To prevent magnetic fields from penetrating into the battery space 530d and into the interior of the vehicle, there may be a conductive layer shield 532d (e.g., a copper sheet) between the battery space 530d and the vehicle. Furthermore, a non-conductive (e.g., plastic) protective layer 534d may be used to protect the conductive layer shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542d is similar to that of FIG. 5B except there is no conductive shielding at the electric vehicle induction coil module 542d. The conductive shield 532d stays with the battery unit body. The protective layer 534d (e.g., plastic layer) is provided between the conductive shield 532d and the electric vehicle induction coil module 542d when the electric vehicle induction coil module 542d is not in a deployed state. The physical separation of the electric vehicle induction coil module 542d from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive layer shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a). For example, the guidance system may present the vehicle operator with information helpful in positioning the electric vehicle 112 (e.g., by presenting signs, directions, or other information to the vehicle operator, for example, by augmented reality displayed in the driver's cockpit). This information can include information (e.g., a driving angle, a distance value) derived from a beacon guidance subsystem (e.g., magnetic or electromagnetic).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
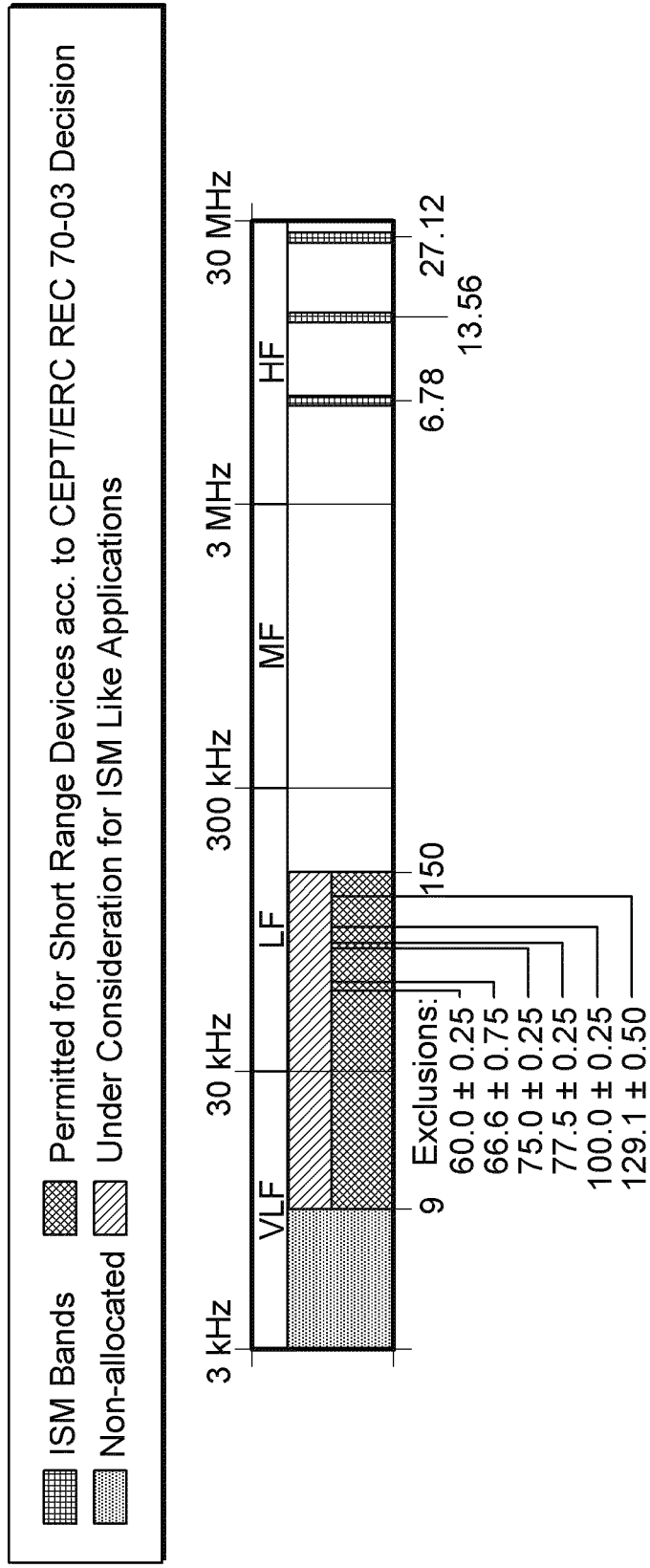
FIG. 6 is a chart of a frequency spectrum showing exemplary frequencies that may be used for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
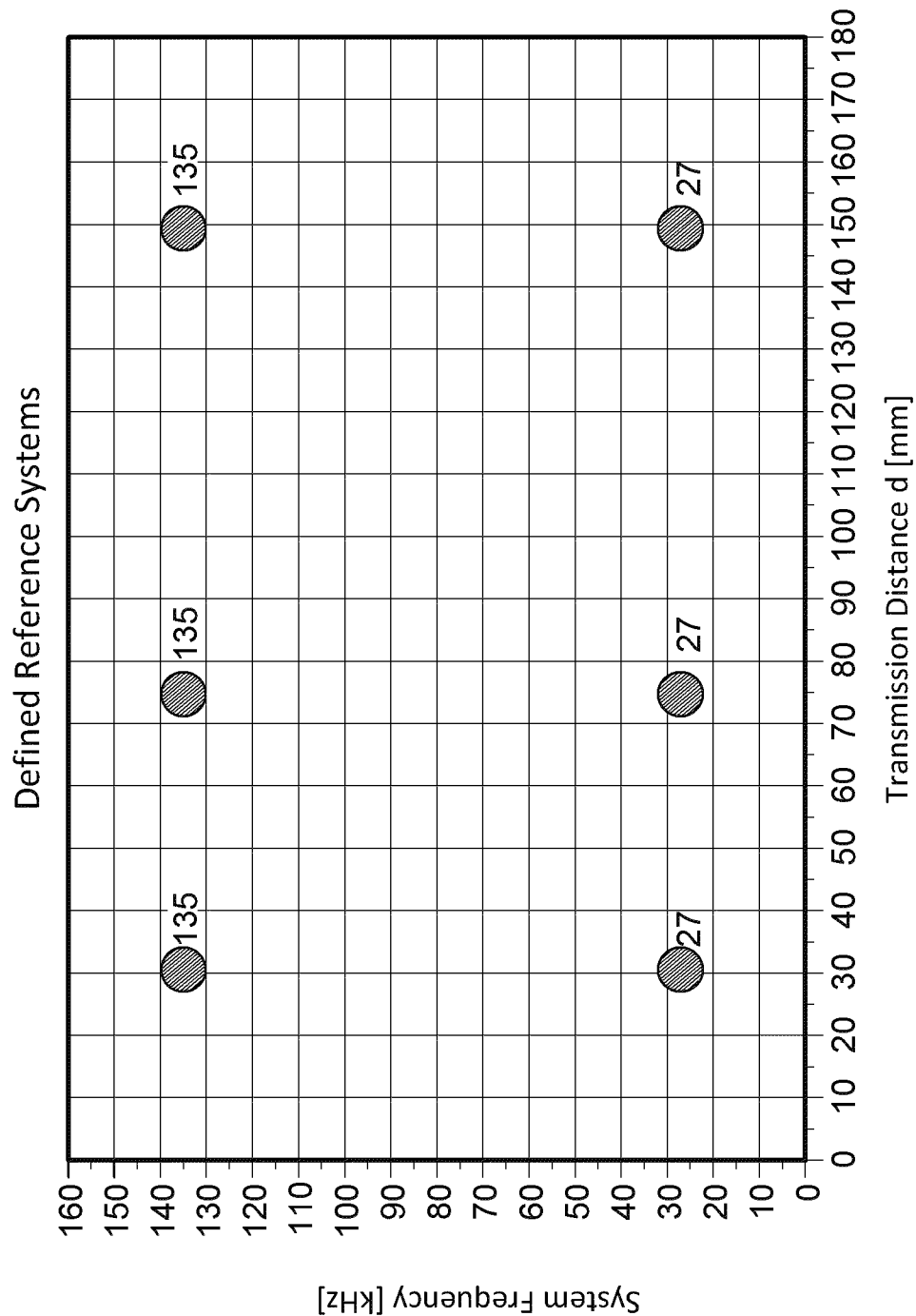
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of an electric vehicle, a Base Charging Unit (BCU) of the wireless power transfer system may go through various states of operation. The wireless power transfer system may be referred to as a "charging system." The BCU may include the base wireless charging system 102a and/or 102b of FIG. 1. The BCU may also include a controller and/or a power conversion unit, such as power converter 236 as illustrated in FIG. 2. Further, the BCU may include one or more base charging pads that include an induction coil, such as induction coils 104a and 104b as illustrated in FIG. 1. As the BCU goes through the various states, the BCU interacts with a charging station. The charging station may include the local distribution center 130, as illustrated in FIG. 1, and may further include a controller, a graphical user interface, a communications module, and a network connection to a remote server or group of servers.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned (e.g., using a sense current) along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (such as the guidance systems 362 and 364, described above with respect to FIG. 3) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a). For example, the guidance system may present the vehicle operator with information helpful in positioning the electric vehicle 112 (e.g., by presenting signs, directions, or other information to the vehicle operator, for example, by augmented reality displayed in the driver's cockpit). This information can include information (e.g., a driving angle, a distance value) derived from a beacon guidance subsystem (e.g., magnetic or electromagnetic).

Figure 8A:
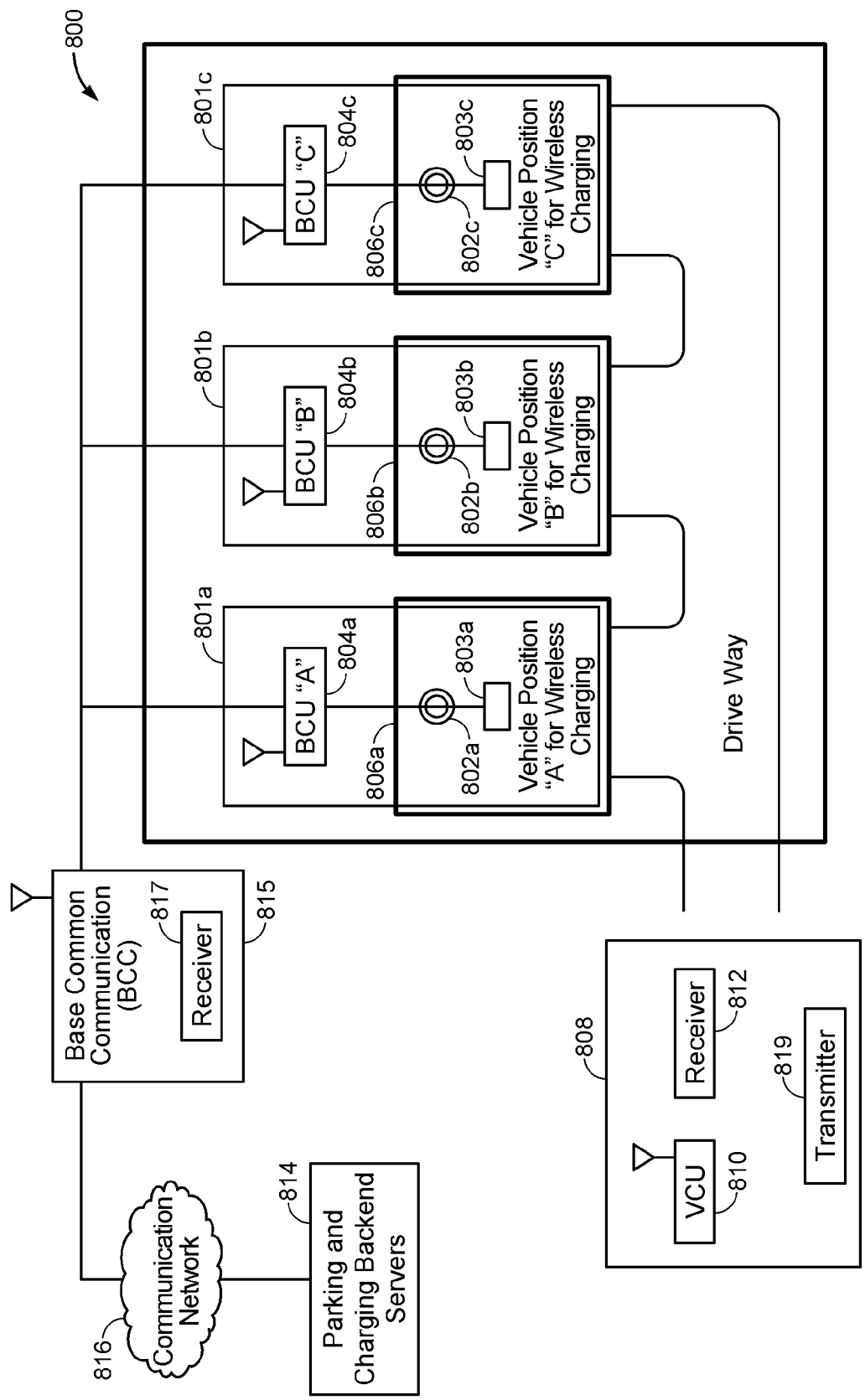
FIG. 8A is a functional block diagram of an exemplary multi-vehicle and multi-parking parking and charging system, in accordance with various implementations.

FIG. 8A is a functional block diagram of an example multi-vehicle and multi-parking parking and charging system 800, in accordance with various implementations. The components illustrated in FIG. 8A may be used in the wireless power transfer system 100 of FIG. 1, in accordance with various embodiments. In one embodiment, the parking and charging system 800 may include a plurality of charging stations 801a-c, each corresponding to one of a plurality of parking spaces 806a-c, that allow the system 800 to simultaneously charge a plurality of vehicles, such as an electric vehicle 808. In some embodiments, each charging station 801a-c may include a Base Controller Unit (BCU) (e.g., BCUs 804a-c), a base pad (e.g., base pads 802a-c), and a transmitter 803 (e.g., transmitters 803a-c).

The transmitter 803 can be configured to transmit BCU identification to a vehicle 808 (e.g., received by a receiver 812 of the vehicle 808) that is in a range of reception when the vehicle 808 is in a location compatible with charging the vehicle 808 using the BCU corresponding to the transmitter 803. For example, the transmitters 803a-c can each transmit a signal (e.g., a beacon signal) comprising the BCU identification and configured to be received by the receiver 812 of the vehicle 808. In some aspects, the transmitters 803a-c may be configured such that the charging station identifier transmitted by a first transmitter 803a can only be received by a vehicle 808 that is positioned substantially within a parking space in which the transmitter 803a is positioned. For example, a vehicle 808 that is positioned substantially within a parking space in which charging station 801a is positioned may only be able to receive the charging station identifier from transmitter 803a but may not be able to receive the charging station identifiers for charging stations 801b and 801c. In a non-limiting example, the strength of the transmitted signal from the transmitter 803a may be at a level sufficient for successful transmission of the charging station identifier to a vehicle 808 located in a single parking space. In other aspects, a vehicle 808 may be able to receive transmissions from multiple adjacent charging stations 801a, 801b, and 801c, but the vehicle 808 is configured to specifically identify the charging station 801a, 801b, or 801c from which a transmission originates based on one or more characteristics of the transmission (e.g., based on signal strength or based on being able to determine a directional component of the transmission). This may enable the vehicle 808 to be able to determine the charging station identifier from the transmission of the particular charging station 801a, 801b, or 801c that the vehicle 808 is being positioned to wirelessly receive power from. Various communication formats (e.g., RFID, Bluetooth LE, a short range proximity detection technology) are compatible with use for the transmitters 803a-c and receiver 812 in accordance with certain embodiments described herein. This communication channel between the BCUs 804a-c and the vehicle 808 can be considered to be a type of proximity detector in one aspect. In certain embodiments in which the BCU 804 also receives information directly from the vehicle 808, appropriate transceivers can be used in place of the transmitters 803 and the receiver 812.

In accordance with an embodiment, the charging stations 801a-c may communicate with a communication hub, e.g., a base common communication (BCC) system 815 configured to communicate with each of the base charging stations 801a-c and configured to communicate with one or more parking and charging backend servers 814 via a network 816. The network 816 may be any type of communication network such as, for example, the Internet, a wide area network (WAN), a wireless local area network (WLAN), etc. Various communication formats (e.g., HomePlug, Ethernet, RS-485, CAN) are compatible for communication between the BCC system 815 and the BCUs 804a-c in accordance with certain embodiments described herein. The communication hub can be either separate from the plurality of charging stations 801a-c or can be part of the plurality of charging stations 801a-c.

The BCC 815 can comprise a receiver 817 configured to communicate with a transmitter 819 of the vehicle 808, as described more fully below. Various communication formats (e.g., DSRC, Bluetooth LE, WiFi) are compatible for communication between the BCC system 815 and the vehicle 808 (via the receiver 817 and the transmitter 819) in accordance with certain embodiments described herein. In certain embodiments in which the BCC 815 also transmits information to the vehicle 808, an appropriate transceiver can be used in place of the receiver 817 and an appropriate transceiver can be used in place of the transmitter 819.

In some embodiments, each charging station 801a-c can correspond to the base wireless charging system 302, discussed above with respect to FIG. 3. For example, the BCUs 801a-c can correspond to the base charging system controller 342, the base pads 802a-c can correspond to the base system induction coil 304, and each charging station 801a-c can include the base charging communication system 372. In other embodiments, the charging system 800 may include one or more base wireless charging systems 302, which can each include a plurality of each system component such as the base charging system controller 342, and the base system induction coil 304. In various embodiments, the transmitters 803a-c can be placed curbside, on the ground next to the base pads 802a-c, and/or integrated directly into the base bad 802a. The charging stations 801a-c can include multiple transmitters.

In some embodiments, the plurality of parking spaces 806a-c are each marked with a space indicator, such as a letter or a number. For example, a sign of a charging station may be provided on the parking space so as to allow a driver to identify the corresponding charging station 801. As shown in FIG. 8A, the parking space 806a, corresponding to the charging station 801a, the BCU 804a, and the base pad 802a, may be marked with a space indicator "A." The parking space 806b, corresponding to the charging station 801b, the BCU 804b, and the base pad 802b, may be marked with a space indicator "B." The parking space 806c, corresponding to the charging station 801c, the BCU 804c, and the base pad 802c, may be marked with a space indicator "C." The space indicators may assist a user to identify available charging stations 801a-c in the parking and charging system 800.

The electric vehicle 808 may include a Vehicle Controller Unit (VCU) 810, a receiver 812, and a transmitter 819. In an embodiment, the electric vehicle 808 can be the vehicle 112 (FIG. 1). The electric vehicle 808 can include the electric vehicle charging system 314, described above with respect to FIG. 3. For example, the VCU 810 can correspond to the electric vehicle controller 344, and the electric vehicle 808 can include the electric vehicle communication system 374. The electric vehicle 808 may include multiple receivers, transmitters, and/or transceivers.

The electric vehicle communication system 374 may be used to communicate with one or more of a plurality of base charging communication systems 372 located within each of the charging stations 801a-c in the parking and charging system 800. As discussed above, with respect to FIG. 3, the electric vehicle communication system 374 can communicate with the base charging communication system 372 by any wireless communication system such as Dedicated Short-Range Communications (DSRC), IEEE 802.11 (e.g., WiFi), Bluetooth, zigbee, cellular, etc. Accordingly, in some embodiments, the electric vehicle communication system 374 can act as a base station to which the base charging communication system 372 can connect. In other embodiments, each base charging communication system 372 can act as a base station to which the electric vehicle communication system 374 can connect.

Figure 8B:
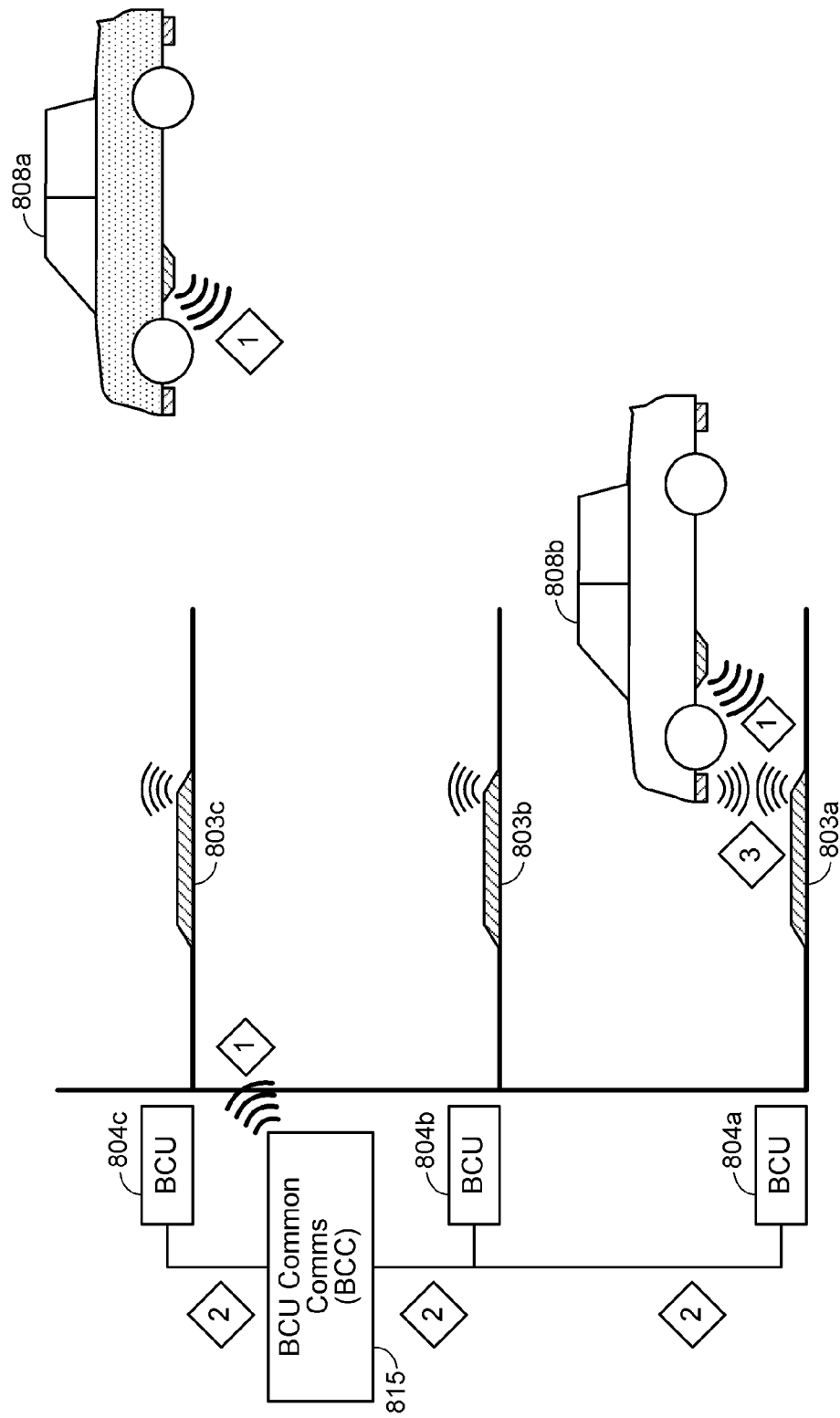
FIG. 8B schematically illustrates an example sequence of communication between the BCC, the BCUs, and the vehicle in accordance with certain embodiments described herein.

FIG. 8B schematically illustrates an example configuration with communication between the BCC 815, the BCUs 804, and the vehicle 808 in accordance with certain embodiments described herein. Prior to the electric vehicle 808 (e.g., vehicle 808a) being positioned over a parking spot (e.g., while or upon entering the parking and charging system 800 with the plurality of BCUs 804*a-c*), a first communication link (denoted by diamonds labeled "1" in FIG. 8B) can be established between the vehicle 808 and the BCC 815 (e.g., using transmitter 819 and receiver 817). The vehicle 808 can transmit at least one first signal to the BCC 815 via the first communication link (e.g., while the vehicle 808*a* is a first distance from at least one charging station 801). The at least one first signal can comprise information, examples of which include but are not limited to, the vehicle identification, vehicle characteristics, driver information, information regarding the payment method expected to be used, or other information that may be helpful in assigning, scheduling, or reserving one of the BCUs 804 for charging of the vehicle 808.

In certain embodiments, the BCC 815 can also transmit information (e.g., by transmitting at least one third signal) to the vehicle 808 via the first communication link (e.g., in configurations in which transceivers are used in place of transmitter 819 and receiver 817). Information transmitted by the BCC 815 to the vehicle 808 can include but are not limited to, the number of BCUs 804 which are available for charging the vehicle 808, the identities of the BCUs 804 which are available for charging the vehicle 808, a schedule of costs for charging, a charging menu of options available for charging the vehicle 808 using the available BCUs 804, and other information that may be helpful in assigning, scheduling, or reserving one of the BCUs 804 for charging of the vehicle 808. For example, prior to the electric vehicle 808 entering the parking and charging system 800, the BCC 815 can inform the vehicle 808 that BCUs 804*b*, 804*c* are available (with the parking space for BCU 804*a* being occupied by another vehicle 808*b*). Upon the assignment, schedule, or reservation being made to charge the vehicle 808, the BCC 815 can transmit information to the vehicle 808 via the first communication link regarding the identity of the one or more BCUs 804 available to charge the vehicle 808 (e.g., the identity of the one BCU 804 assigned, scheduled, or reserved for charging the vehicle 808).

The BCC 815 can also communicate with the various BCUs 804 (e.g., via a wired connection, denoted by diamonds labeled "2" in FIG. 8B). For example, the BCC 815 can communicate with the BCUs 804*a-c* to find out which of the BCUs 804*a-c* are available for charging the vehicle 808. In certain embodiments, upon the assignment, schedule, or reservation for charging of the vehicle 808, the BCC 815 can transmit information to the one or more BCUs 804 available for charging of the vehicle 808 (e.g., the identity of the vehicle 808 to be charged).

In certain embodiments, the BCC 815 can keep track of which BCUs 804 are currently unavailable for charging an incoming vehicle 808. For example, the BCC 815 can keep track of which BCUs 804 are being used to charge another vehicle (e.g., BCU 804*a* being used to charge vehicle 808*b* in FIG. 8B). In certain embodiments, non-electric vehicles may also be parked over one or more of the BCUs 804 such that these BCUs 804 are also not available for charging the vehicle 808, even though they are not currently being used to charge a vehicle 808. In certain such embodiments, the BCUs 804 are configured to detect whether there is a non-electric vehicle parked at (e.g., over) the BCU 804. For example, the BCU 804 can be configured to periodically or intermittently inject a low current into the charging pad 802 and to measure an inductance change due to a large metallic object over the charging pad 802. Upon detecting an inductance change indicative of a non-electric vehicle, the BCU 804 can communicate to the BCC 815 that the BCU 804 is unavailable for charging the vehicle 808 (e.g., marking the BCU 804 as being unavailable for charging electric vehicles).

When the electric vehicle 808 enters the parking and charging system 800 with the plurality of available charging stations 801*a-c*, a driver of the vehicle 808 is able to identify one or more of the charging stations 801 (e.g., the charging station 801 comprising the BCU 804 scheduled to charge the vehicle 808). In one embodiment, the driver of a vehicle 808 may visually identify the parking spaces 806 using, for example, the space indicators as described above. Thus, a driver of the vehicle 808 may navigate within the parking facility to find the available (e.g., assigned, scheduled, or reserved) charging station 801 for providing energy to charge the electric vehicle 808. As described above, the BCC 815 may communicate to the vehicle 808 a specific charging station 804 that the charging system 808 has reserved for the vehicle 808. The information regarding the charging station 804 may be provided to the user via a user interface. When the vehicle 808 approaches the parking space 806, or once the vehicle 808 is parked in the parking space 806, the charging station 801 may attempt to pair with the vehicle 808 which is now within communication range.

The transmitter 803 of the charging station 801 can be configured to transmit at least one second signal (e.g., a beacon signal) via a second communication link (e.g., while the vehicle 808 is a second distance from the at least one charging station 801, with the second distance less than the first distance). The at least one second signal can comprise an identification of the BCU 804, and the receiver 812 of the electric vehicle 808 can be configured to receive the at least one second signal. Each base charging communication system 372 can act as a base station to which the electric vehicle communication system 374 can connect. Each BCU 804 can have a globally or locally unique identifier (e.g., "BCU1"), which the base communication system 372 can broadcast. For example, in an embodiment using the DSRC standard, the base charging communication system 372 can broadcast a WBSS ID of "BCU1." The transmitter 803 of the charging station 801 can be configured to indicate the ID of the BCU 804, and/or the broadcast identifier (e.g., "BCU1"). Accordingly, when the electric vehicle 808 enters a parking space such as the parking space 806*a*, the receiver 812 on the vehicle 808 can receive the identifier of the BCU 804.

Because the receiver 812 on the electric vehicle 808 can have a shorter communication range than the electric vehicle communication system 374 (e.g., the first communication link has a longer range than does the second communication link), the receiver 812 may only be capable of receiving the at least one second signal while in the parking space 806*a*. The VCU 810 can obtain the identifier of the BCU 804*a* from the receiver 812, and can cause the electric vehicle communication system 374 to connect to the appropriate base charging communication system 372. In certain embodiments, the charging station 801 can start a sense current at the base pad 802 to be used to help align the electric vehicle 808 with the base pad 802 when the electric vehicle 808 receives the identification of the charging station 801 and connects via the base charging communication system 372.

If the driver has positioned the vehicle 808 in proximity to a different BCU 804 than one previously assigned, scheduled, or reserved for charging the vehicle 808, the BCC 815 can reassign, reschedule, or re-reserve the BCU 804 in proximity to the vehicle 808 to charge the vehicle 808. If the driver has positioned the vehicle 808 between two adjacent BCUs 804, the BCC 815 can make an appropriate assignment of one of the two BCUs 804 to charge the vehicle 808 (e.g., the BCU 804 closest to the vehicle 808), even if this assignment comprises de-assigning the previously-scheduled BCU 804 in favor of the different BCU 804.

Once a communication link is established between the electric vehicle 808 and the charging station 801 corresponding to appropriate parking space 806, the communication link can be used for one or more of: electric vehicle guidance, electric vehicle alignment, charging control, status communication, authorization, identification, payment management, etc.

Figure 9A:
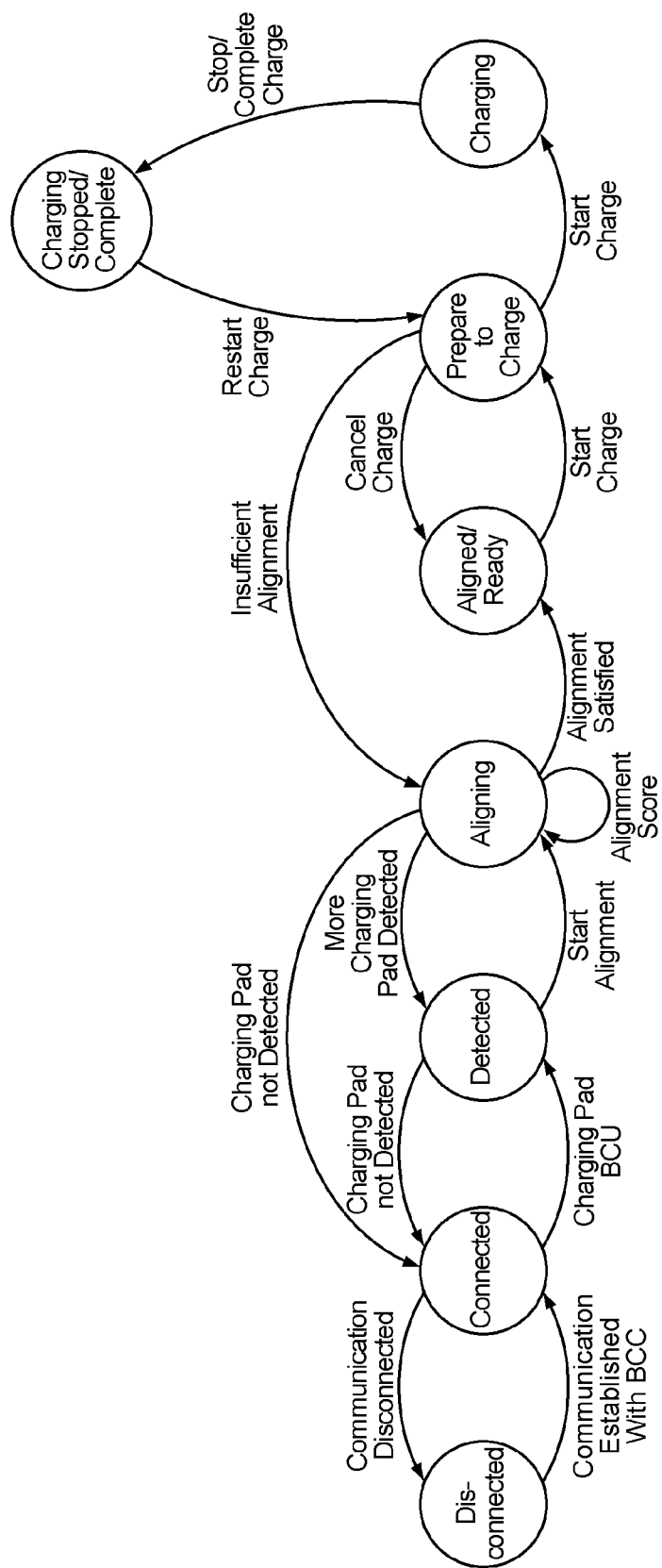
FIG. 9A is an example state diagram for a vehicle in accordance with certain embodiments described herein and FIGS. 9B-9E are example flow diagrams corresponding to the various states.

FIG. 9A is an example state diagram for a vehicle in accordance with certain embodiments described herein and FIGS. 9B-9E are example flow diagrams corresponding to the various states. In a "disconnected" state (see, e.g., FIG. 9D), the vehicle 808 is not yet in communication with the parking and charging system 800 and the vehicle 808 scans (e.g., continuously, periodically, intermittently) for a BCC 815 with which to communicate. In a "connected" state (see, e.g., FIG. 9D), after having detected a BCC 815 with which to communicate, the vehicle 808 can establish a communication channel (e.g., secure or unsecure) with the BCC 815, and can exchange appropriate information (e.g., vehicle identification) with the BCC 815.

Figure 9B:
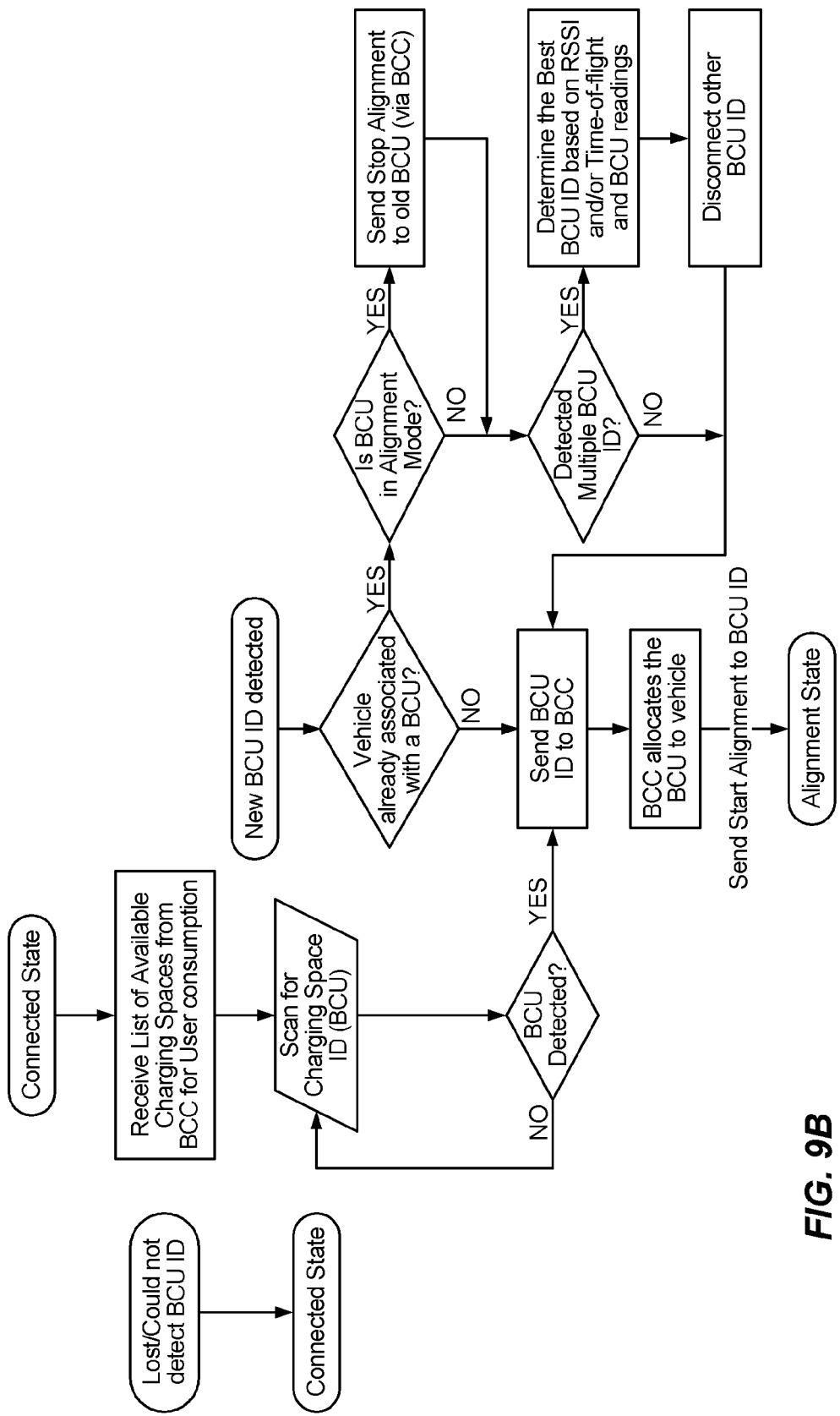

FIG. 9B is an example flowchart of the "detected" state in accordance with certain embodiments described herein. In the "detected" state, the receiver 812 of the vehicle 808 detects the signal from the transmitter 803 of the BCU 804 so the vehicle 808 is in a location compatible with proceeding with the charging process. For example, the vehicle 808 can receive a list of available BCUs 804 from the BCC 815 for charging the vehicle 808, and can scan for one of the available BCUs 804. Upon detecting an available BCU 804, the vehicle 808 can send the BCU identification to the BCC 815, which then allocates the detected BCU 804 to the charging of the vehicle 808, and enters the "start alignment" state. If an available BCU 804 is not detected, the vehicle 808 reenters the "connected" state.

The receiver 812 of the vehicle 808 can continually, periodically, or intermittently scan for a BCU identification throughout the alignment process and/or the charging process. If a new BCU identification is detected (e.g., due to the vehicle 808 moving closer to another available BCU), then the vehicle 808 determines if the vehicle 808 is already associated with another BCU. If not, then the vehicle 808 sends the BCU identification to the BCC 815, which then allocates the detected BCU 804 to the charging of the vehicle 808, and enters the "start alignment" state. The allocation of the BCU 804 to the charging of the vehicle 808 can be performed by the vehicle 808, by the BCC 815, or by both. If the vehicle 808 is already associated with another BCU 804, then the vehicle 808 determines if the BCU 804 is in an alignment mode, and if so the alignment mode is stopped. If the vehicle 808 detects multiple BCUs, then the vehicle 808 can determine the more optimal BCU to use (e.g., closest BCU) for charging, for example, based on the received signal strength indication (RSSI) and/or the time-of-flight and BCU readings. The determination of the more optimal BCU to use for charging can be performed by the vehicle 808, by the BCC 815, or by both. The vehicle 808 can then disconnect from the less optimal BCU and can send the identification of the more optimal BCU to the BCC for allocation to the charging process. After allocating a BCU to the charging process, an alignment process is begun.

Figure 9C:
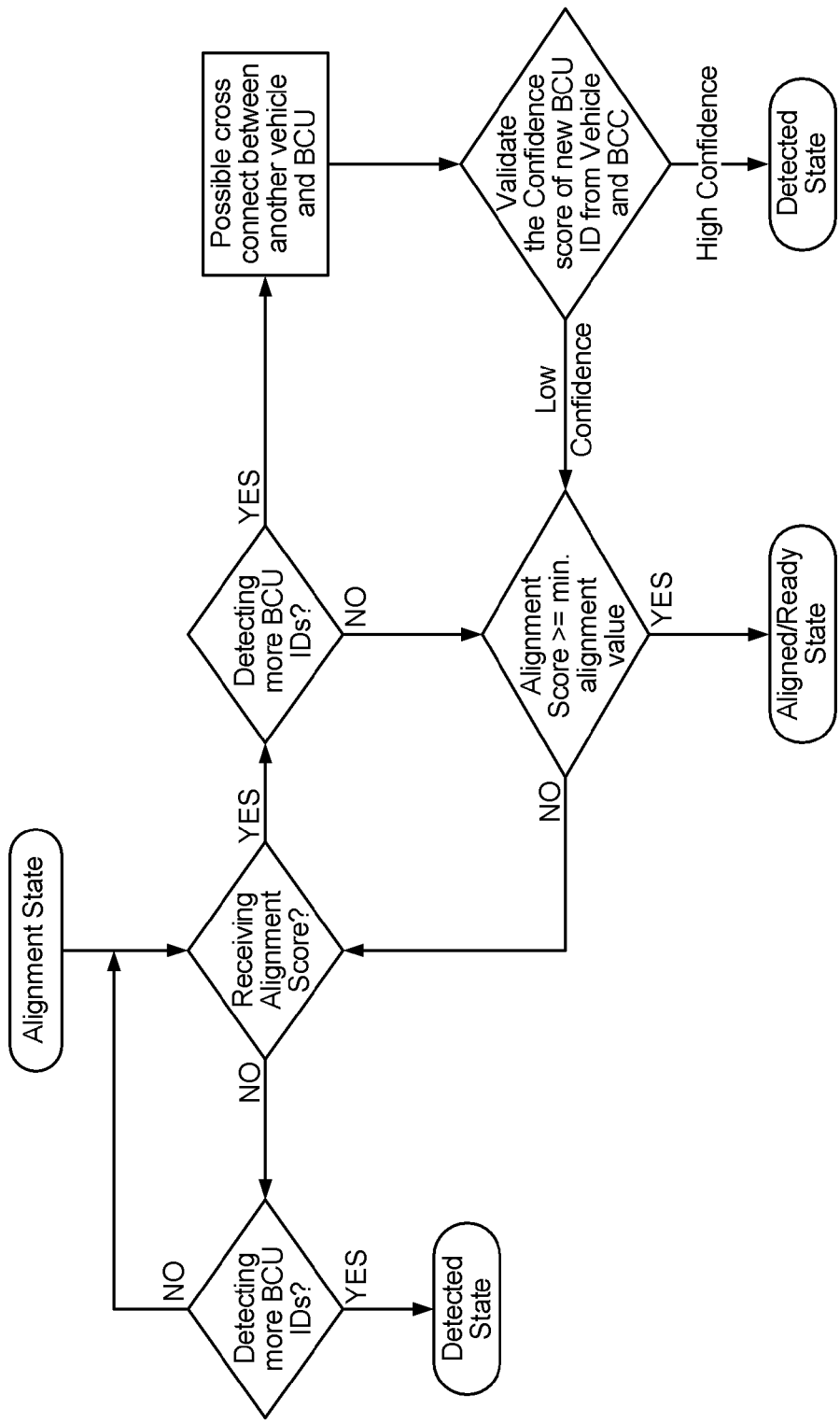
Figure 9D:
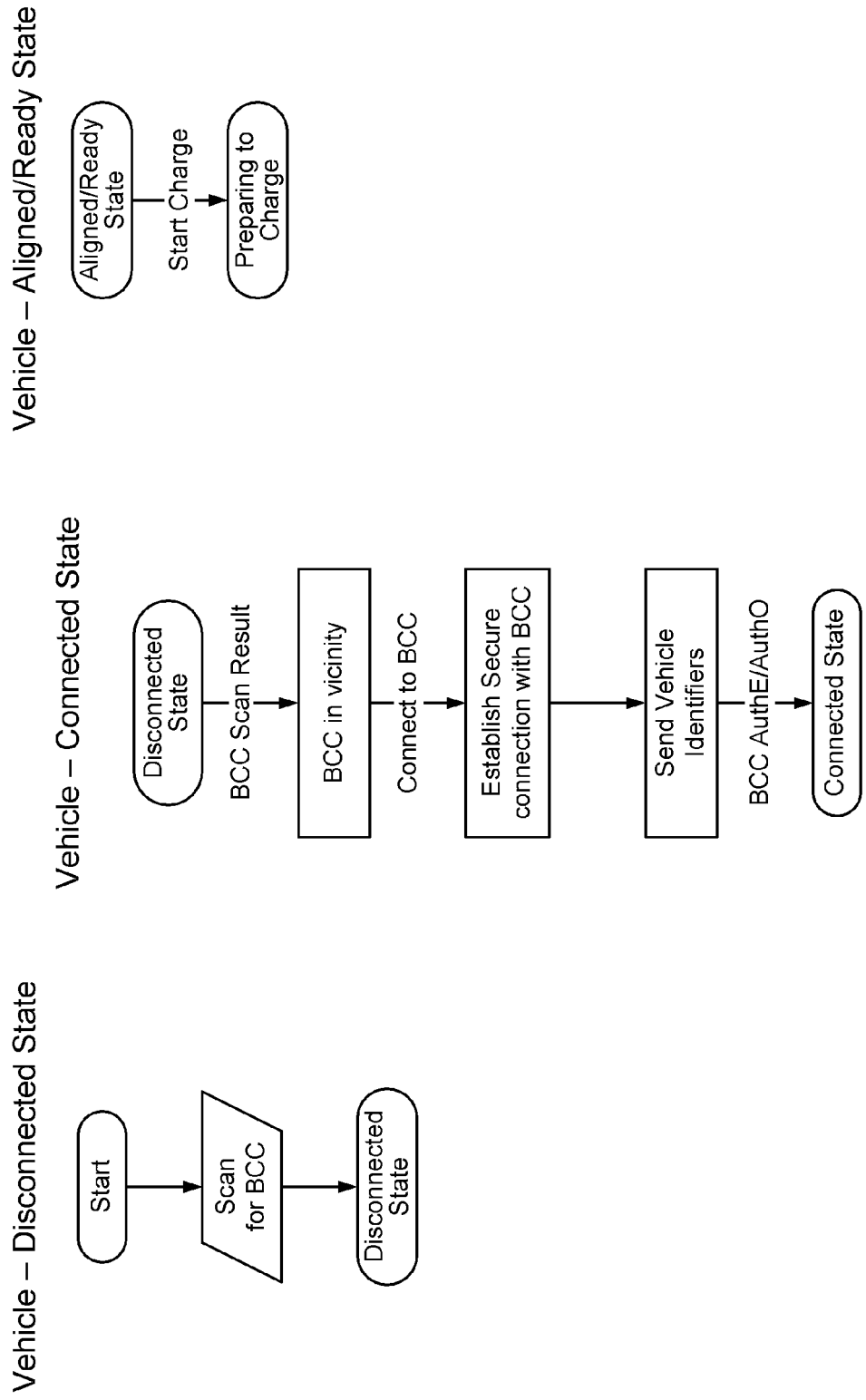
Figure 9E:
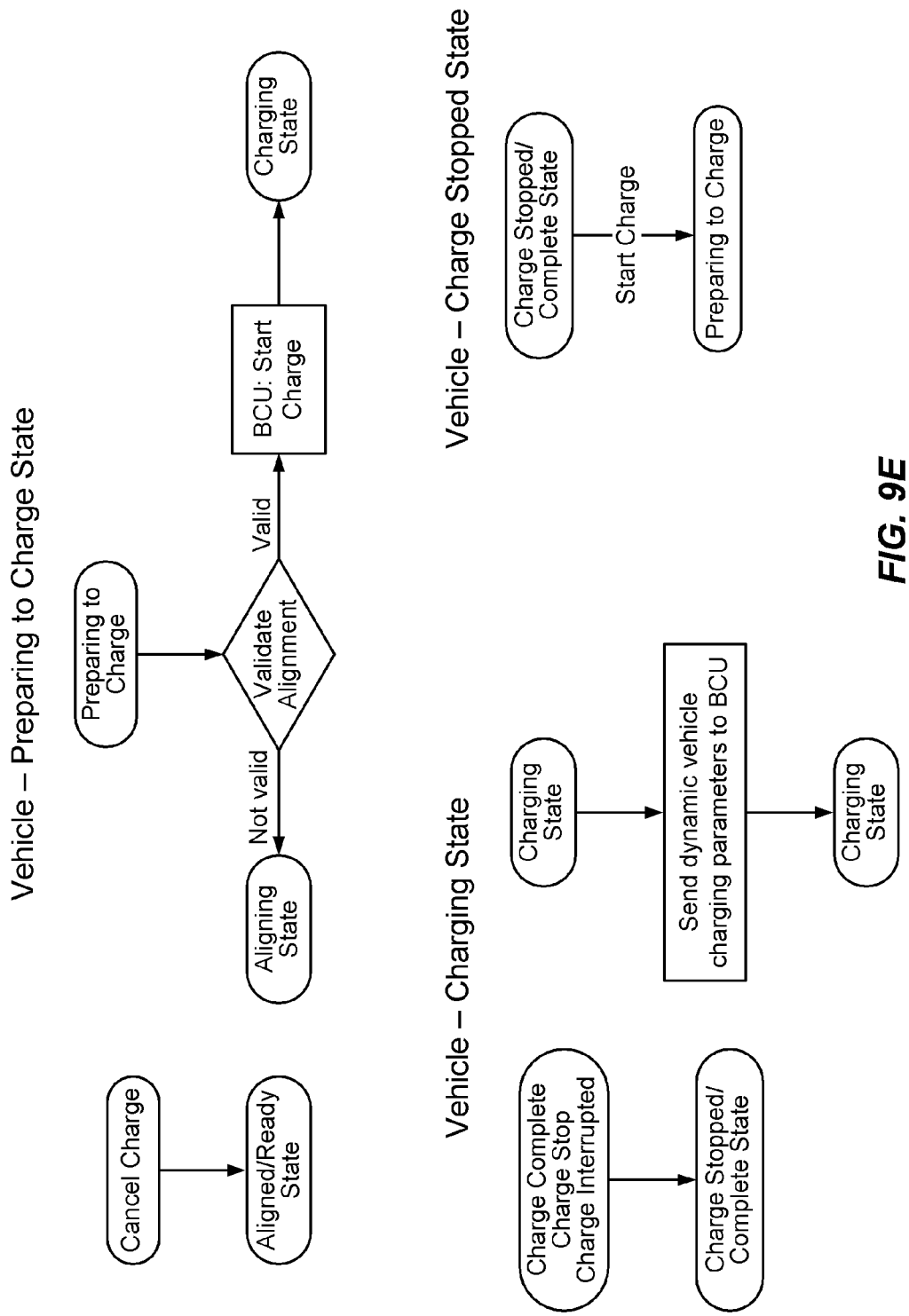

FIG. 9C is an example flowchart of the "aligning" state in accordance with certain embodiments described herein. In the "aligning" state, the alignment process proceeds to align the charging pad 802 with the coils of the VCU 810 of the vehicle 808, with a score or other measure of the degree of alignment being checked (e.g., continually, periodically, intermittently) to determine if the desired level of alignment is achieved. For example, if the alignment score is greater than or equal to a predetermined level, then the charging pad 802 and the VCU 810 are deemed to be aligned, and the vehicle 808 enters the "aligned/ready" state. The "aligned/ready" state (see, e.g., FIG. 9D) is the resting state after completed alignment, until user action or vehicle action to start charging is received.

Once user action or vehicle action to start charging is received, the vehicle 808 is in a "prepare to charge" state (see, e.g., FIG. 9E) in which the alignment is validated. If valid alignment, the charging process proceeds, and if not valid alignment, the vehicle reenters the "aligning" state.

In the "charging" state (see, e.g., FIG. 9E), dynamic vehicle charging parameters are sent to the BCU and the charging process proceeds to charge the vehicle 808. In a "charging stopped/complete" state (see, e.g., FIG. 9E), the charging process has been halted, either because of a detected fault condition or because the vehicle 808 is fully charged. If the charging process was halted due to a detected fault condition, the charging process can restart once the fault condition is resolved. For example, if the fault condition is that alignment was insufficient to proceed with the charging process, the vehicle 808 can be placed again in the "aligning" state.

Figure 10:
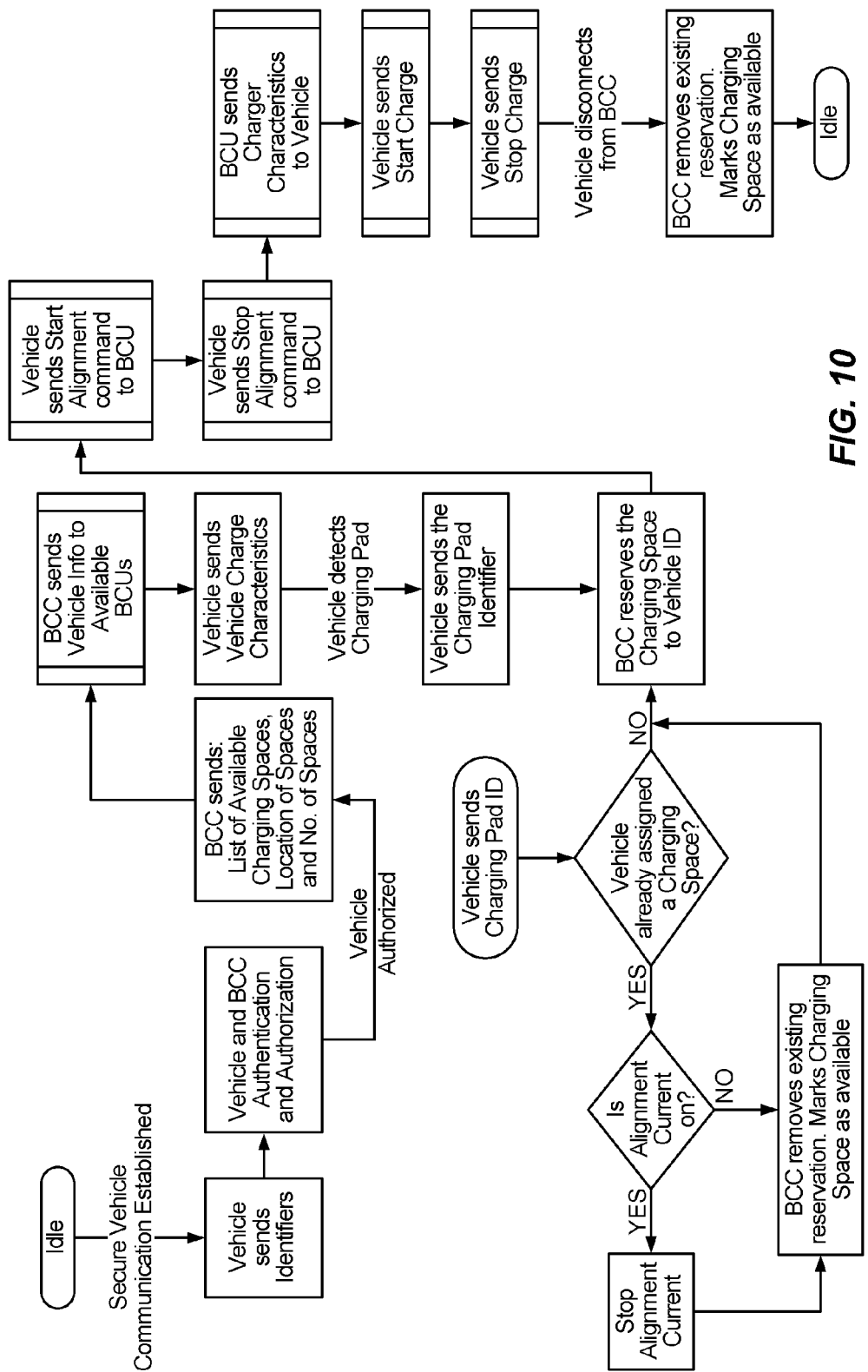
FIG. 10 is an example flow diagram for the communications between the vehicle and the BCC in accordance with certain embodiments described herein.

FIG. 10 is an example flow diagram for the communications between the vehicle 808 and the BCC 815 in accordance with certain embodiments described herein. The flow diagram of FIG. 10 can be applied to each vehicle 808 that communicates with the BCC 815. Once a communication channel (e.g., secure or unsecure) is established between the vehicle 808 and the BCC 815, the vehicle 808 can send information (e.g., a vehicle identification, charging characteristics of the vehicle) to the BCC 815, and the vehicle 808 can be authorized to be charged by the charging system 800. The BCC 815 can send to the vehicle 808 information regarding the list of available charging spaces, the locations of such available spaces, and the number of such available spaces. The BCC 815 can also send the vehicle identification and/or other information received from the vehicle 808 to the available BCUs 804.

Once in proximity to the BCU 804, the vehicle 808 can detect the signal from the transmitter 803 of the charging station 801 and can send the charging pad identifier to the BCC 815, which then can reserve the detected BCU for the vehicle identification of the vehicle 808. After initiating and completing an alignment process to align the VCU 810 of the vehicle 808 with the charging pad of the BCU 804, the BCU 804 can send the charger characteristics to the vehicle 808, and the charging process can proceed. Once charging is completed and the vehicle 808 is disconnected from the BCU 804 and the BCC 815, the BCC can remove the existing reservation and mark the BCU 815 as being available again. If during the process flow of FIG. 10, the vehicle 808 detects another BCU identification, the BCC 815 can check to see if the vehicle 808 has already been assigned another charging space with another BCU 804 and whether the alignment current is on. Depending on these conditions, the BCC 815 can change the BCU 804 which is reserved to the vehicle 808.

In certain embodiments, the BCU 804 can also detect the vehicle identification and can measure the RSSI and/or the time-of-flight (e.g., round-trip delay) of signals between the BCU 804 and the vehicle 808 to determine which BCU 804 is closest to the vehicle 808, which can be deemed to be the best BCU 804 for charging the vehicle 808. The determination of the best BCU to use for charging can be performed by the vehicle 808, by the BCC 815, or by both. In a similar manner to the transmission by the BCU of its identification to the vehicle 808, the vehicle 808 of certain embodiments can transmit its identification to the BCU. For example, the vehicle 808 can use an algorithm with rolling vehicle identification to deal with privacy issues. In certain embodiments, the electric vehicle 808 is configured to turn on and off the transmitter 819 (e.g., automatically or by the driver) to avoid transmitting the at least one first signal during times at which such transmission is not needed or is not desired (e.g., to protect privacy).

Figure 11:
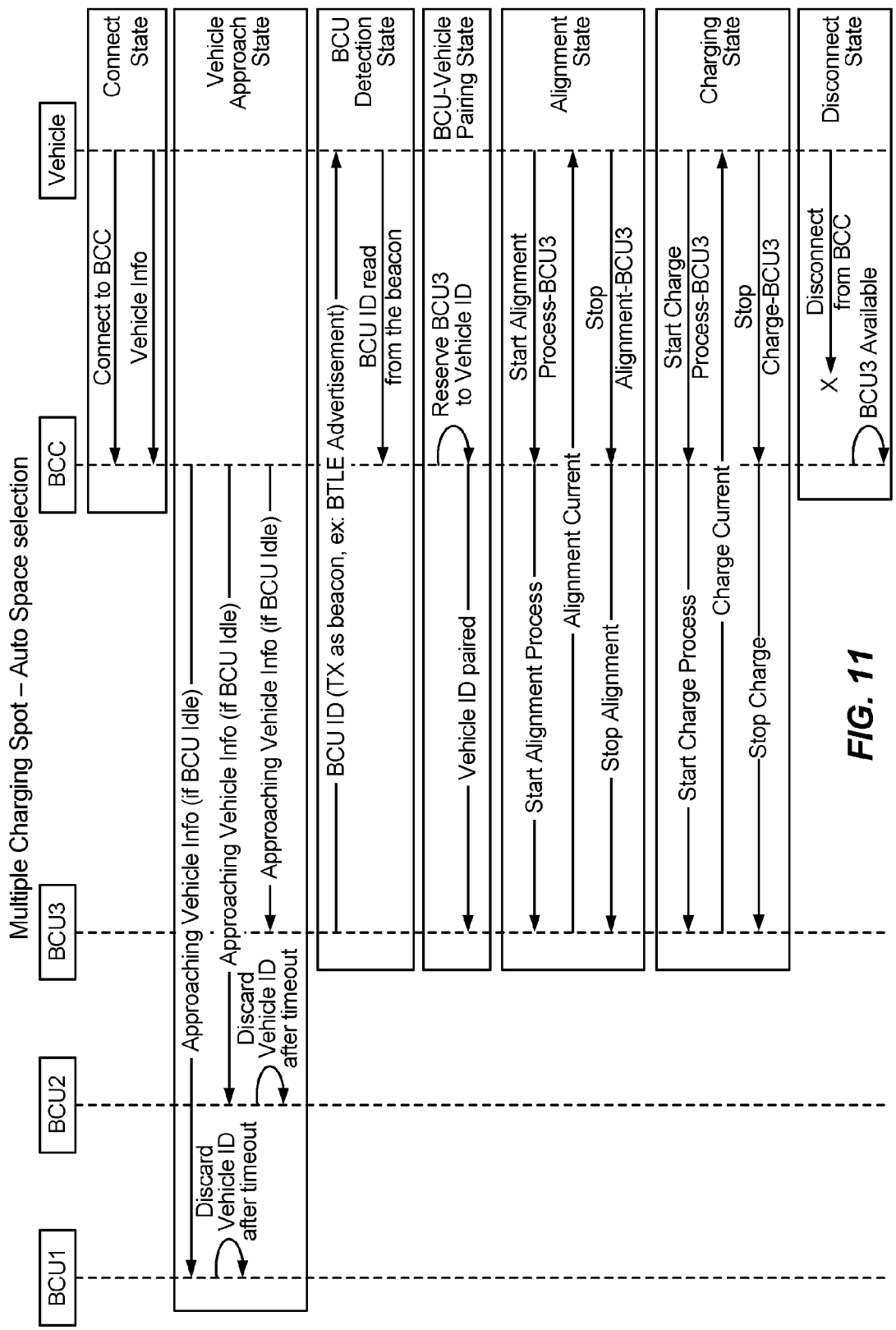
FIG. 11 is an example diagram of the signals sent among the vehicle, the BCC, and the BCUs (e.g., BCU1, BCU2, BCU3) in an automatic charging space selection process in accordance with certain embodiments described herein.

FIG. 11 is an example diagram of the signals sent among the vehicle 808, the BCC 815, and the BCUs 804 (e.g., BCU1, BCU2, BCU3) in an automatic charging space selection process in accordance with certain embodiments described herein. In a connect state, the vehicle 808 can connect to the BCC 815 and transmit vehicle information to the BCC 815 (e.g., in at least one first signal via a first communication link) (e.g., while the vehicle 808 is a first distance from at least one charging station 801). In a vehicle approach state, the BCC 815 can transmit information regarding the approaching vehicle 808 to the BCUs 804. BCUs that are not idle (e.g., BCUs that are not available for charging the approaching vehicle 808; BCU1 and BCU2 in FIG. 11) can timeout and discard the vehicle information (e.g., vehicle identification) after a predetermined period of time. In a BCU detection state, an idle BCU (e.g., BCU3) can transmit its BCU identification (e.g., in at least one second signal via a second communication link, such as a Bluetooth LE advertisement) (e.g., while the vehicle 808 is a second distance, that is less than the first distance, from the at least one charging station 801) to the vehicle 808, and the vehicle 808 can transmit the received BCU identification to the BCC 815.

In a BCU-vehicle pairing state, the BCC 815 can reserve the BCU (e.g., BCU3) for charging the vehicle 808 having the vehicle identification that was received in the connect state, and the BCC 815 can send a corresponding signal to the BCU (e.g., BCU3) which pairs the vehicle identification with the BCU. In an alignment state, the vehicle 808 can send a signal to the BCC 815, which sends a signal to the BCU 804, starting the alignment process, and the BCU 804 can respond by transmitting an alignment current through its charging pad. Once alignment has been completed, the vehicle 808 can send a signal to the BCC 815, which sends a signal to the BCU 804, stopping the alignment process. In a charging state, the vehicle 808 can send a signal to the BCC 815, which sends a signal to the BCU 804, starting the charging process, and the BCU 804 can respond by transmitting a charging current through its charging pad. Once charging has been completed, the vehicle can send a signal to the BCC 815, which sends a signal to the BCU 804, stopping the charging process. In a disconnect state, the vehicle 808 disconnects from the BCC 815, and the BCC 815 notes that the BCU 804 is again available for charging an incoming vehicle.

In accordance with certain embodiments above, the exchanges of information may use two different channels for communications related to different purposes. Certain aspects of embodiments below are directed to different types of communication that may happen over different channels in accordance the embodiments described above. While the embodiments below may be described relative to the electric vehicle wireless charging system 114 and base wireless charging system 102a of FIGS. 1-3, the embodiments are applicable any of the configurations of communication controllers described herein, particularly with reference to FIGS. 8A and 8B, for example with respect to the descriptions of the communications between BCU 804 and VCU 810. For example, the communication controllers described below may be configured in accordance with FIG. 8A in certain aspects.

The electric vehicle infrastructure communication interface may include two different channels (e.g., a first communication link and a second communication link), that are configured to effectively manage the charging process. In certain embodiments, a method is provided for communicating with a wireless electric vehicle charging system 800 including a charging station 801 configured to charge an electric vehicle 808. The method includes establishing a first communications link between the electric vehicle 808 and a communications controller (e.g., BCC 815) of the charging system 800. The method includes exchanging, via the first communications link, one or more service messages with the communications controller (e.g., BCC 815) of the charging system 800, the service messages indicative of at least one of one or more capabilities of the electric vehicle 808 or charging system 800, authorization, or authentication for wirelessly receiving power from the charging station. The method further includes sending via the first communications link, in response to exchanging the one or more service messages, a guidance request message indicative of a request for guiding the electric vehicle 808 to the charging station 801. The method further includes receiving one or more guidance beacons from the charging station 801 for performing at least one of a guidance operation or an alignment operation with the charging station 801, the guidance beacon forming at least in part a second communication channel. The method further includes extracting an identifier of the charging station 801 from the guidance beacon. The method further includes sending a message to the communications controller indicative of alignment between the electric vehicle 808 and the charging station 801, the message further comprising the identifier of the charging station 801 and an identifier of the electric vehicle 808. The method further includes sending a charging request message to the communications controller in response to sending the message indicative of alignment via the first communications channel. Examples of guidance beacons compatible with certain embodiments described herein include, but are not limited to, magnetic guidance beacons and electromagnetic guidance beacons.

In certain embodiments, the method further includes establishing the second communications link with the charging station 801, with the second communication link configured to communicate data via modulation of the wireless power field used for transferring power to the electric vehicle 808. The second communication link can be configured to communicate data via one of load modulation or angle modulation of the wireless power field used for transferring power to the electric vehicle 808. In certain embodiments, the second communication link is configured to communicate data relating to at least one of power control between the electric vehicle 808 and the charging system 800, safety signaling, an identifier of the charging station, guidance information, or alignment information via one of load modulation or angle modulation. The second communication link can be configured to communicate via modulation at or substantially at a frequency of the wireless power field. The second communication link can be configured to broadcast a device identifier (ID) of the charging station via modulation of the wireless power field used for transferring power.

In certain embodiments, an apparatus is provided for wirelessly receiving power at an electric vehicle 808 from a charging station 801. The apparatus includes a wireless power receive circuit including a power transfer component configured to wirelessly receive power from the charging station 801 at a level sufficient to charge a battery of an electric vehicle. The apparatus further includes a communications controller (e.g., VCU 810) operably connected with the wireless power receive circuit. The communications controller is configured to establish a first communications link with a base communications controller 815 of a charging system configured to control the charging station 801. The communications controller is further configured to exchange, via the first communications link, one or more service messages with the base communications controller 815 of the charging system, the service messages indicative of at least one of one or more capabilities of the electric vehicle 808 or charging system 800, authentication, or authorization for wirelessly receiving power from the charging station 801. The communications controller is further configured to send via the first communications link, in response to exchanging the one or more service messages, a guidance request message indicative of a request for guiding the electric vehicle 808 to the charging station 801. The wireless power receive circuit is configured to receive one or more guidance beacons from the charging station 801 for performing at least one of a guidance operation or an alignment operation with the charging station 801, the guidance beacon forming at least in part a second communication channel. The wireless power receive circuit is configured to further extract an identifier of the charging station 801 from the guidance beacon. The communications controller is further configured to send a message to the base communications controller 815 indicative of alignment between the electric vehicle 808 and the charging station 801, the message further comprising the identifier of the charging station 801 and an identifier of the electric vehicle 808. The communications controller is further configured to send a charging request message to the base communications controller 815 in response to sending the message indicative of alignment via the first communications channel. Examples of guidance beacons compatible with certain embodiments described herein include, but are not limited to, magnetic guidance beacons and electromagnetic guidance beacons.

In certain embodiments, an apparatus is provided for communicating with a wireless electric vehicle charging system 800 including a charging station 801 configured to charge an electric vehicle 808. The apparatus includes means for establishing a first communications link between the electric vehicle 808 and a communications controller of the charging system 800. The apparatus further includes means for exchanging, via the first communications link, one or more service messages with the communications controller of the charging system 800, the service messages indicative of one or more capabilities of the electric vehicle 808 or charging system 800, authorization, or authentication for wirelessly receiving power from the charging station 801. The apparatus further includes means for sending via the first communications link, in response to exchanging the one or more service messages, a guidance request message indicative of a request for guiding the electric vehicle 808 to the charging station 801. The apparatus further includes means for receiving one or more guidance beacons from the charging station 801 for performing at least one of a guidance operation or an alignment operation with the charging station 801, the guidance beacon forming at least in part a second communication channel. The apparatus further includes means for extracting an identifier of the charging station 801 from the guidance beacon. The apparatus further includes means for sending a message to the communications controller indicative of alignment between the electric vehicle 808 and the charging station 801, the message further comprising the identifier of the charging station 801 and an identifier of the electric vehicle 808. The apparatus further includes means for sending a charging request message to the communications controller in response to sending the message indicative of alignment via the first communications channel. Examples of guidance beacons compatible with certain embodiments described herein include, but are not limited to, magnetic guidance beacons and electromagnetic guidance beacons.

In certain embodiments, a method is provided for communicating with a wireless electric vehicle charging system including a charging station 801 configured to charge an electric vehicle 808. The method includes establishing a first communications link between the electric vehicle 808 and a communications controller of the charging system 800. The method further includes exchanging, via the first communications link, one or more service messages with the communications controller of the electric vehicle 808, the service messages indicative of at least one of one or more capabilities of the electric vehicle 808 or charging system 800, authentication, or authorization for wirelessly receiving power from the charging station 801. The method further includes receiving via the first communications link, in response to exchanging the one or more service messages, a guidance request message indicative of a request for guiding the electric vehicle 808 to the charging station 801. The method further includes sending a message to the charging station to transmit one or more guidance beacons from the charging station 801 for performing at least one of a guidance operation or an alignment operation with the electric vehicle 808. The method further includes receiving a message from the communications controller (e.g., VCU 810) of the electric vehicle 808 indicative of alignment between the electric vehicle 808 and the charging station 801, the message further comprising the identifier of the charging station 801 and an identifier of the electric vehicle 808. The method further includes receiving a charging request message from the communications controller of the electric vehicle 808 in response to receiving the message indicative of alignment via the first communications channel. The method further includes sending a message to the charging station 801 to initiate power transfer. In certain embodiments, the method further includes establishing a second communications link with the electric vehicle, with the second communication link configured to communicate data via modulation of the wireless power field used for transferring power to the electric vehicle. Examples of guidance beacons compatible with certain embodiments described herein include, but are not limited to, magnetic guidance beacons and electromagnetic guidance beacons.

The first communication link may be "out-of-band" channel based on, for example, IEEE 802.11 or the like. The second communication link may be a channel that uses magnetic in-band communication (e.g., in-band command and control communication for electric vehicle charging). The in-band channel may reuse existing power charging features and components, for example by modulating the power carrier field from the base wireless charging system 102a (e.g., primary) and by modulating the load at the electric vehicle wireless charging system 114 (e.g., secondary). Modulating the power carrier (e.g., modulating the wireless field used for power transfer) at the base wireless charging system 102a may include a variety of types of modulation techniques such as, for example amplitude modulation and angle modulation. Angle modulation may include any type of phase modulation, frequency modulation and the like. Furthermore, modulation may include modulation of the magnetic vector angle at the base wireless charging system 102a to accomplish communication. In some aspects, such modulation may not add any extra hardware cost since existing components of the base wireless charging system are used for accomplishing the in-band signalling.

The second channel using magnetic in-band communication may be used for localized safety and power control signalling. Use of the second in-band channel may provide protection against signal interference, jamming, or providing reduced opportunity for hacking. Other communication may take place via the first out-of-band channel.

The base wireless charging system 102a and the electric vehicle wireless charging system 114 can both implement a wireless channel for communication. Each system may have a corresponding communication controller.

In an embodiment, the second in-band channel may be used to ensure that the electric vehicle wireless charging system 114 remains in alignment and that safety is not compromised (due to dedicated safety/power control channel). In addition, the second in-band channel, modulated at or near the carrier frequency or power transfer, may broadcast the device identifier (ID) of the base wireless charging system 102a. Such broadcasting of the ID allows for the electric vehicle to communicate with wireless charging system 114 to determine the ID of the base wireless charging system 102a while aligning, similar to as described above. At the end of alignment, the electric vehicle wireless charging system 114 may send an "alignment completed" message via the first out-of band channel to a base wireless charging system communications controller, the message including the ID of the vehicle and the ID of the base wireless charging system 102a. For example, a communications controller may coordinate communication for several base charging stations, as described above with reference to FIG. 8A, and therefore receive the ID of the vehicle and the ID of the associated base wireless charging system 102a with which the vehicle is positioned for wireless power transfer (e.g., the associated base wireless charging system 102a that the vehicle is positioned over). Magnetic vectoring can also be used, allowing the vehicle to have guidance into the parking spot, followed by alignment with the base wireless charging system.

In certain embodiments, the second in-band-channel may also communicate power level requests from the electric vehicle wireless charging system 114, e.g., by modulating the load. The response from the base wireless charging system 102a can be communicated back in-band by changing the power level and also via in-band communication.

In an embodiment, when a command has not been sent for a pre-determined period of time, e.g., via the second in-band communication channel, between the electric vehicle wireless charging system 114 and the base wireless charging system, the electric vehicle wireless charging system 114 sends a "heartbeat" message to the base wireless charging system 102a. If no response is returned, the electric vehicle wireless charging system 114 starts emergency shutdown procedures. If no message has been received from the electric vehicle wireless charging system 114 within a predetermined period of time, then the base wireless charging system 102a starts emergency shutdown procedures.

In an embodiment, if a live object is detected by the electric vehicle wireless charging system 114, a power pause command is sent.

In an embodiment, the first out-of-band communication channel (e.g., via IEEE 802.11 or the like) may be used for other features such as for high-level commands. Such features may include, for example, optional value-added services, charging and metering. The first out-of-band channel may also be used for guidance information, pairing, starting power transfer, and resuming power transfer. Various power control messages generally sent via the second in-band channel may also be sent via the first out-of-band communication channel.

Furthermore, when a command has not been sent between the communication controllers of the electric vehicle wireless charging system 114 and the base wireless charging system 102a for a predetermined amount of time, the base wireless charging system can terminate power transfer. A command to terminate power transfer may be sent via the second in-band channel, but may also be sent via the first out-of-band channel. If billing parameters and requirements are part of the charging, then the appropriate commands may be sent via the first out-of-band communication channel.

Prior to having pairing and power transfer take place, communication over the first out-of-band channel can be established between the electric vehicle wireless charging system communication controller and the base wireless charging system communications controller. In an embodiment, once alignment and pairing are complete, and power transfer has started, then safety and power control messages are exchanged via the second in-band channel.

As described above, in an aspect, communication via the second in-band channel from the electric vehicle wireless charging system to the base wireless charging system may be accomplished by modulation of the field, such as varying the load of the electric vehicle wireless charging system 114.

As further described above, communication over the second in-band channel from the base wireless charging system 102a and the electric vehicle wireless charging system 114 may be accomplished by modulation of the carrier of the power supplied to the vehicle (e.g. angle modulation of the carrier of the power supplied to the vehicle).

In an embodiment, in order for the second magnetic in-band communication channel to be formed/used, initial communication takes place over the first out-of-band channel. The following exemplary sequence of information exchanges may be used in accordance with an embodiment, although any combination or orders of the exchanges described below are contemplated to be in accordance with the principles described herein. First, there may be an association between the communication controller associated with the base wireless charging system and the electric vehicle wireless charging system via the first out-of-band channel. Further exchanges of service discovery and service details may take place via the first channel. Service discovery may include the exchange of hardware capabilities via the first channel. In addition, optionally other exchanges related to service and payment selection, payment details, and contract authentication can take place via the first channel.

If the hardware or billing method is not compatible, then the sequence can terminate. The base wireless charging system 102*a* may determine the hardware compatibility, and the electric vehicle wireless charging system may determine the billing compatibility.

After the initial association and other sequences, the communication controller for the electric vehicle wireless charging system can send a guidance request to the communications controller for the base wireless charging system via the first channel. The base wireless charging system then may activate the guidance beacons of the charging system. The electric vehicle 112 can then move to the parking spot where guidance and alignment may take place.

During guidance and alignment, the electric vehicle wireless charging system 114 can detect guidance beacon(s) and may read an ID for the base wireless charging system 102*a* transmitted in the guidance beacon, and can (optionally) provide guidance to the driver. The ID via the guidance beacon may be considered via the second in-band channel in some aspects.

As the electric vehicle moves into parking spot, the electric vehicle wireless charging system 114 can switch from guidance to alignment. The electric vehicle wireless charging system 114 can continue to detect the magnetic beacon, and can provide alignment information to the driver. The electric vehicle wireless charging system may again read the ID of the base wireless charging system 102*a* from the guidance beacon.

Once, the electric vehicle 112 comes to a stop, the electric vehicle wireless charging system 114 and the base wireless charging system may confirm alignment via the magnetic beacon.

In an embodiment, the communication controller for the electric vehicle wireless charging system 114 sends an message indicating that alignment has completed via the first out-of-band channel and may include the ID of the electric vehicle wireless charging system 114 and the ID of the base wireless charging system. Such communication may be used when a communication controller for the base wireless charging system 102*s* is connected and manages communications for several base wireless charging systems 102*a*, 102*b*, and the communication controller for the base wireless charging system 102*a* may need to know which specific base wireless charging system 102*a* the electric vehicle 112 is positioned to initiate wireless power transfer (e.g., which specific base wireless charging system 102*a* the electric vehicle 112 is parked over), as described above with reference to FIGS. 8A-8B. Likewise, if the communication controller is configured to support a single base wireless charging system 102*a*, the base wireless charging system can utilize confirmation that the electric vehicle is indeed positioned (e.g., parked over) for wireless power transfer with the specific base wireless charging system 102*a*.

During a pairing process, the electric vehicle wireless charging system 114 can retrieve the ID of the base wireless charging system 102*a*, for example encoded in a magnetic beacon, and can then send a message indicating alignment is completed to the communication controller of the base wireless charging system. As described, the message can include the ID of the base wireless charging system 102*a* and the ID of the electric vehicle wireless charging system 114. If the communication controller for the base wireless charging system 102*a* does not have a base wireless charging system with that ID, then the communication controller of the base wireless charging system can reject the message indicating alignment is completed, implying that the electric vehicle wireless charging system is in communication with the wrong communication controller for the base wireless charging system.

If the communication controller for the base wireless charging system accepts the message indicating that alignment is complete, then power transfer can be initiated.

After establishing the first out-of-band communication channel (e.g., after communicating the message that indicates alignment is complete), if the optional billing features are implemented, the communication controllers for the electric vehicle wireless charging system 114 and the base wireless charging system 102*a* can exchange messages for billing/metering purposes via the first out-of-band communication channel.

In an embodiment, to initiate power transfer, the electric vehicle wireless charging system 114 sends a charging initiation message via the first out-of-band channel to the communication controller for the base wireless charging system 102*a*. The communication controller for the base wireless charging system 102*a* sends confirmation if the equipment is functioning properly, otherwise the communication controller for the base wireless charging system 102*a* sends a rejection to the communication controller for the electric vehicle wireless charging system 114 and terminates the power transfer. Once power has started to transfer, then the second in-band channel is activated for exchanging further power control, messages, etc.

Figure 12:
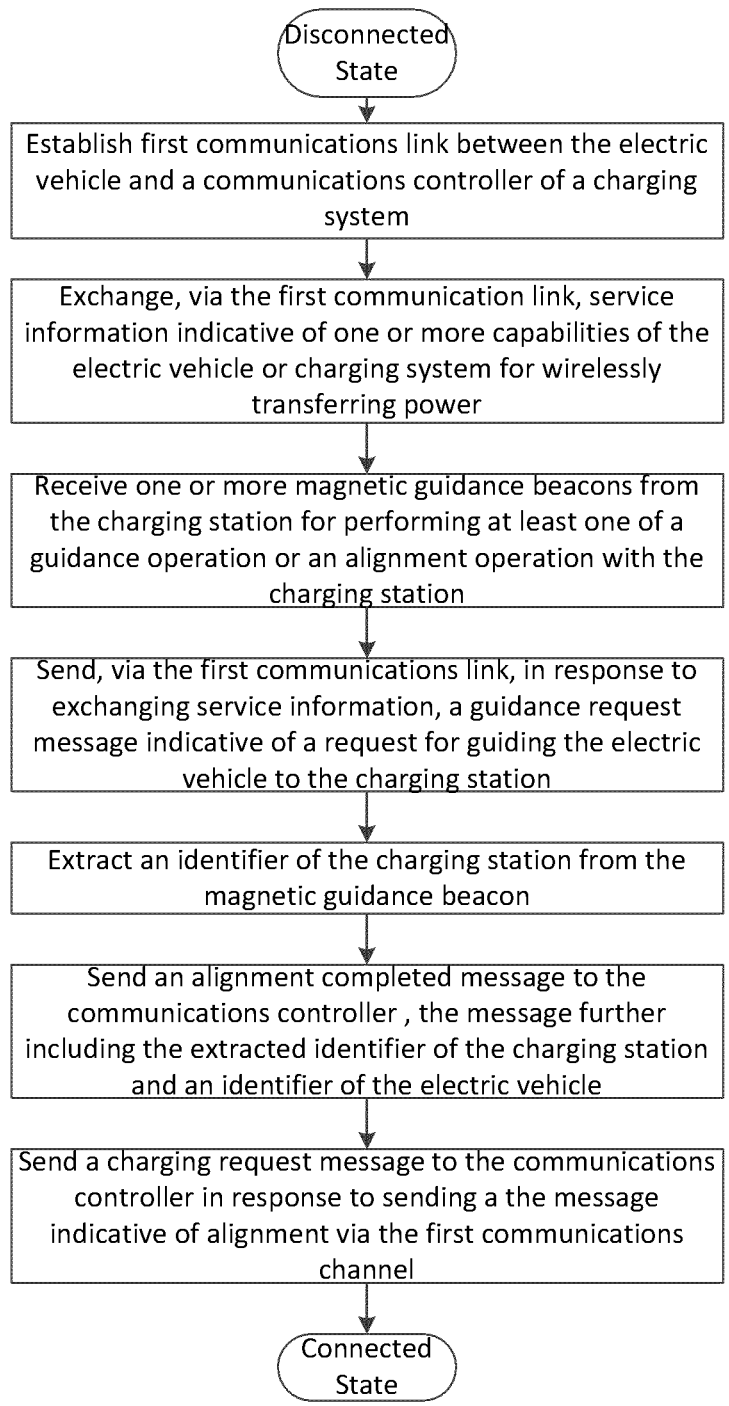
FIG. 12 is a flowchart of an exemplary method for exchanging communication between a charging system and an electric vehicle in accordance with an exemplary embodiment.

In accordance with the communication exchanges described above, FIG. 12 is a flowchart of an exemplary method for exchanging communication between a charging system and an electric vehicle in accordance with an exemplary embodiment.

In an embodiment, examples of requests sent by the electric vehicle wireless charging system 114 to the base wireless charging system 102*a* via the first out-of-band channel include but are not limited to:

Set power level to a specified power level (e.g., to X KW, where X is the specified number of kilowatts).
Set current to a specified current level (e.g., to Y amperes, where Y is the specified number of amperes).
Set voltage to a specified voltage level (e.g., to Z volts, where Z is the specified number of volts).
Pause power transfer (to be restarted via the first channel).
Stop power transfer (no more power is desired by the vehicle).

In an embodiment, examples of requests sent by the electric vehicle wireless charging system 114 to the base wireless charging system 102*a* via the second in-band channel include but are not limited to:
Change Power Setting.
Fast Stop Charging.

The base wireless charging system may send acknowledgment messages back or may not send acknowledgment message via the second in-band channel. In an embodiment, all other commands and responses are sent via the first out-of-band channel.

In an embodiment, the electric vehicle wireless charging system 114 may terminate power transfer either via the first out-of-band channel or the second in-band channel.

Since the baud rate of the second magnetic in-band communication may be lower (e.g., as compared to the first channel) in certain embodiments, small binary commands and responses can be used.

In some embodiments, the first out-of-band channel may also be used in-lieu of the second in-band channel as a backup to second in-band communication.

In one aspect, a potential order of messages may substantially include: service discovery, service details, service and payment selection, payment details, contract authentication, charge parameter discover, power delivery, metering status, metering receipt, and terminate charging. It should be appreciated that this is one possible order and any other order of the above or exclusion of certain messages are contemplated according to the embodiments described herein.

Figure 13:
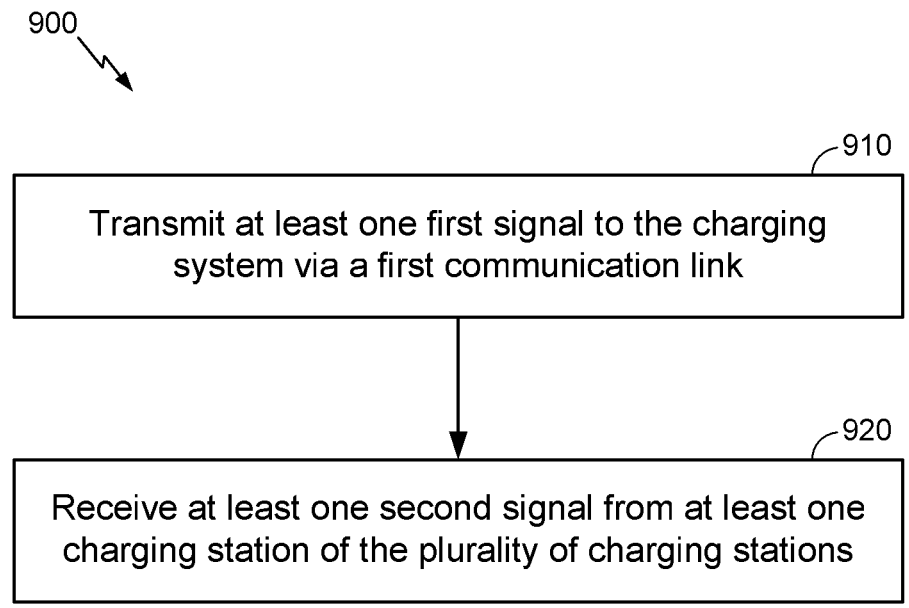
FIG. 13 illustrates a flowchart of an exemplary method of communicating with a charging system comprising a plurality of charging stations configured to charge an electric vehicle, in accordance with certain embodiments described herein.
Figure 14:
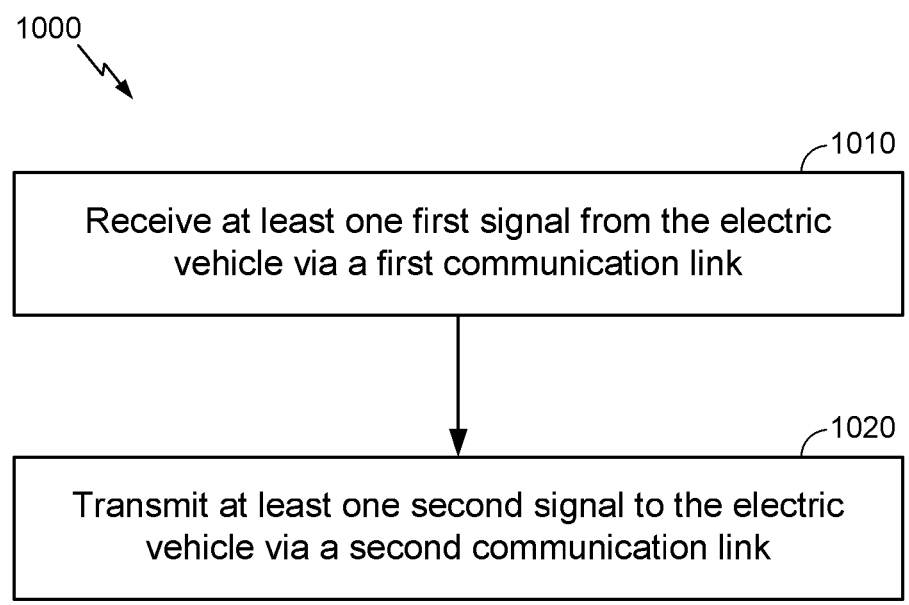
FIG. 14 illustrates a flowchart of an exemplary method of communicating with an electric vehicle in accordance with certain embodiments described herein.

FIG. 13 illustrates a flowchart of an exemplary method 900 of communicating with a charging system 800 comprising a plurality of charging stations configured to charge an electric vehicle 808, in accordance with certain embodiments described herein. FIG. 14 illustrates a flowchart of an exemplary method 1000 of communicating with an electric vehicle 808 in accordance with certain embodiments described herein. Although the method 900 and the method 1000 are described herein with reference to the electric vehicle 808 and multi-vehicle and multi-parking parking and charging system 800, discussed above with respect to FIGS. 8A and 8B, a person having ordinary skill in the art will appreciate that the method 900 and the method 1000 may be implemented by other suitable devices and systems. For example, the method 900 may be performed by a processor or controller such as, for example, the VCU 810 (FIG. 8A). For another example, the method 1000 may be performed by a processor or controller such as, for example, the BCC 815 (FIG. 8A). Although the method 900 and the method 1000 are each described herein with reference to a particular order, in various embodiments, blocks herein may be performed in a different order, or omitted, and additional blocks may be added.

In an operational block 910 of the method 900, at least one first signal is transmitted to the charging system 800 via a first communication link (e.g., while the electric vehicle is a first distance from at least one charging station of a plurality of charging stations). The at least one first signal is indicative of a vehicle identifier of the electric vehicle 808. In an operational block 920 of the method 900, at least one second signal is received from the at least one charging station of the plurality of charging stations via a second communication link (e.g., while the electric vehicle is a second distance from the at least one charging station, with the second distance less than the first distance). The at least one second signal is indicative of a charging station identifier of the at least one charging station.

In an operational block 1010 of the method 1000, at least one first signal from the electric vehicle 808 is received via a first communication link (e.g., while the electric vehicle is a first distance from at least one charging station of a plurality of charging stations). The at least one first signal is indicative of a vehicle identifier of the electric vehicle 808. In an operational block 1020 of the method 1000, at least one second signal is transmitted to the electric vehicle via a second communication link (e.g., while the electric vehicle is a second distance from the at least one charging station, with the second distance less than the first distance). The at least one second signal is indicative of an identifier of at least one charging station of a charging station 800.

Figure 15:
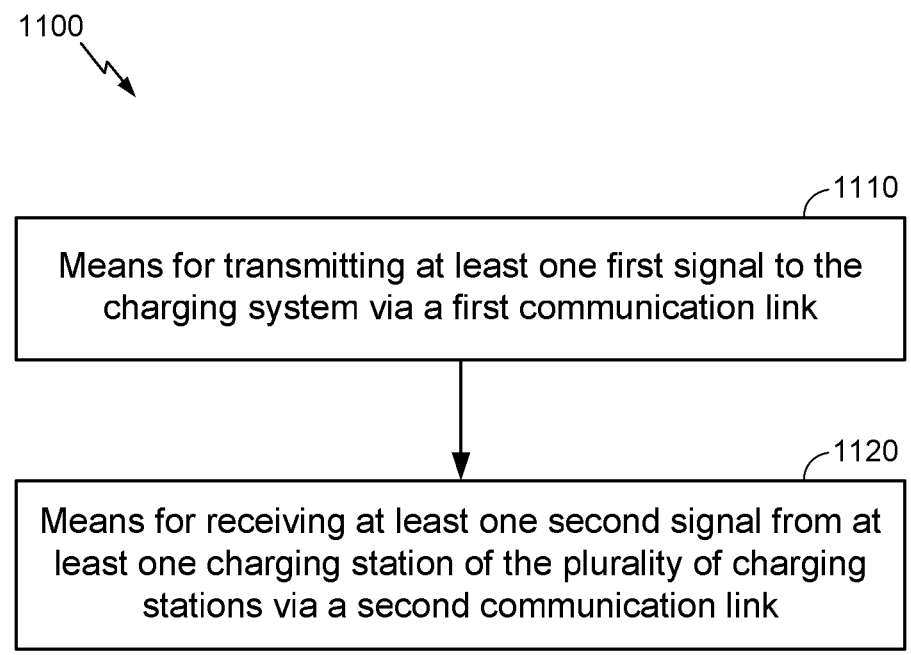
FIG. 15 is a functional block diagram of an apparatus for communicating with a charging system comprising a plurality of charging stations configured to charge an electric vehicle, in accordance with certain embodiments described herein.
Figure 16:
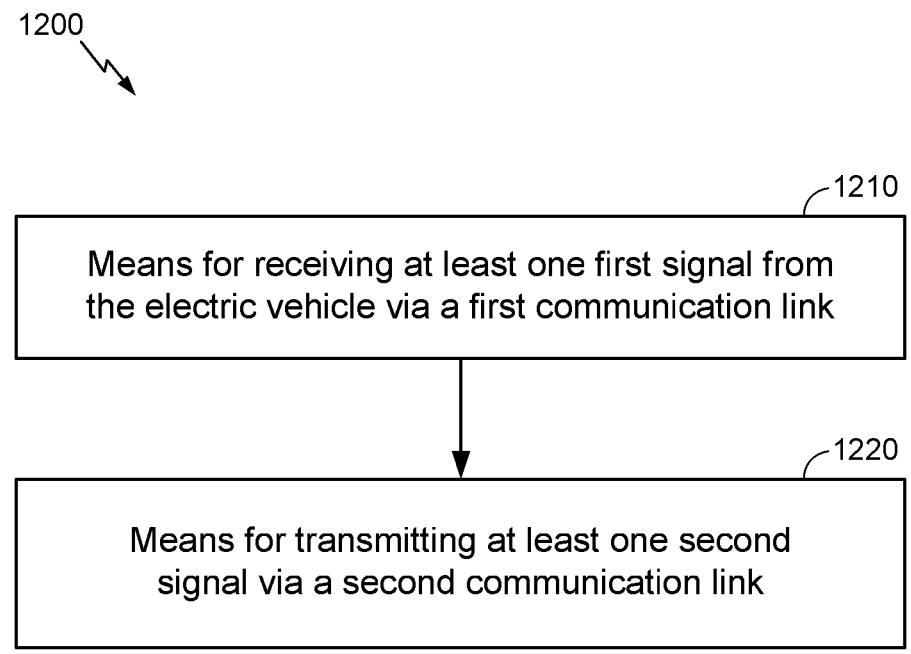
FIG. 16 is a functional block diagram of an apparatus for communicating with an electric vehicle in accordance with certain embodiments described herein.

FIG. 15 is a functional block diagram of an apparatus 1100 for communicating with a charging system comprising a plurality of charging stations configured to charge an electric vehicle, in accordance with certain embodiments described herein. FIG. 16 is a functional block diagram of an apparatus 1200 for communicating with an electric vehicle in accordance with certain embodiments described herein. Those skilled in the art will appreciate that the apparatus 1100 and the apparatus 1200 may have more components than the simplified block diagrams show in FIGS. 15 and 16. FIGS. 15 and 16 include only those components useful for describing some prominent features of implementations within the scope of the claims.

The apparatus 1100 comprises means 1110 for transmitting at least one first signal to the charging system via a first communication link (e.g., while the electric vehicle is a first distance from at least one charging station of a plurality of charging stations), with the at least one first signal indicative of a vehicle identifier of the electric vehicle. In certain embodiments, the means 1110 for transmitting can be implemented by the transmitter 819 (FIG. 8A). The apparatus 1100 further comprises means 1120 for receiving at least one second signal from at least one charging station of the plurality of charging stations via a second communication link (e.g., while the electric vehicle is a second distance from the at least one charging station, with the second distance less than the first distance), with the at least one second signal indicative of a charging station identifier of the at least one charging station. In certain embodiments, the means 1120 for receiving comprises the receiver 812 (FIG. 8A).

The apparatus 1200 includes means 1210 for receiving at least one first signal from the electric vehicle via a first communication link (e.g., while the electric vehicle is a first distance from at least one charging station of a plurality of charging stations), with the at least one first signal indicative of a vehicle identifier of the electric vehicle. In certain embodiments, the means 1210 for receiving can be implemented by the receiver 817 (FIG. 8A). The apparatus 1200 further comprises means 1220 for transmitting at least one second signal via a second communication link (e.g., while the electric vehicle is a second distance from the at least one charging station, with the second distance less than the first distance), with the at least one second signal indicative of an identifier of at least one charging station of a charging system. In certain embodiments, the means 1220 for transmitting comprises the transmitters 803a-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating with a charging system comprising a plurality of charging stations and a communication hub in communication with each charging station of the plurality of charging stations, each charging station configured to wirelessly charge an electric vehicle, the method comprising:
   transmitting at least one first signal to the communication hub of the charging system via a first communication link while the electric vehicle is a first distance from at least one charging station of the plurality of charging stations, the at least one first signal indicative of a vehicle identifier of the electric vehicle;
   receiving at least one second signal from the at least one charging station of the plurality of charging stations via a second communication link while the electric vehicle is a second distance from the at least one charging station of the plurality of charging stations, the second distance less than the first distance, the at least one second signal indicative of a charging station identifier of the at least one charging station; and
   receiving at least one third signal from the communication hub via the first communication link, the at least one third signal comprising information regarding an identity of a charging station available for charging the electric vehicle.

2. The method of claim 1, wherein the at least one third signal comprises information regarding an availability of one or more charging stations of the plurality of charging stations for use in wirelessly charging the electric vehicle.

3. The method of claim 1, wherein the at least one first signal further comprises information regarding at least one of: a vehicle characteristic, driver of the electric vehicle, or a payment method expected to be used.

4. The method of claim 1, wherein the at least one second signal further comprises information regarding at least one of: a number of available charging stations, a charging station characteristic, a schedule of costs for charging, or a charging menu of options available for charging the electric vehicle using the available charging stations.

5. The method of claim 1, wherein the plurality of charging stations are configured to provide wireless power to the electric vehicle.

6. The method of claim 1, further comprising transmitting at least one fourth signal to the charging system via the first communication link, the at least one fourth signal indicative of the charging station identifier.

7. The method of claim 1, wherein the at least one charging station is configured to detect whether a non-electric vehicle is parked at the at least one charging station.

8. The method of claim 1, further comprising allocating the at least one charging station to charging of the electric vehicle.

9. The method of claim 1, further comprising determining an optimal charging station of the at least one charging station to allocate to charging of the electric vehicle.

10. The method of claim 1, further comprising turning on and off a transmitter of the electric vehicle to avoid transmitting the at least one first signal during times at which such transmission is not desired.

11. The method of claim 1, wherein receiving the at least one second signal from the at least one charging station occurs while the electric vehicle is within a parking space in which the at least one charging station is positioned and while the electric vehicle is not able to receive signals from other charging stations of the plurality of charging stations.

12. The method of claim 1, further comprising using the second communication link for one or more of: electric vehicle guidance, electric vehicle alignment, charging control, status communication, authorization, identification, or payment management.

13. A method of communicating with an electric vehicle, the method comprising:
   receiving at least one first signal from the electric vehicle via a first communication link while the electric vehicle is a first distance from at least one charging station of a charging system, the at least one first signal indicative of a vehicle identifier of the electric vehicle, the charging system comprising a communication hub in communication with each charging station of the at least one charging station, the communication hub receiving the at least one first signal;

transmitting at least one second signal to the electric vehicle via a second communication link while the electric vehicle is a second distance from the at least one charging station of the charging system, the second distance less than the first distance, the at least one second signal indicative of an identifier of the at least one charging station of the charging system; and transmitting at least one third signal from the communication hub to the electric vehicle via the first communication link, the at least one third signal comprising information regarding an identity of a charging station available for charging the electric vehicle.

14. The method of claim 13, wherein the at least one third signal comprises information regarding an availability of one or more charging stations of the at least one charging station for use in charging the electric vehicle.

15. The method of claim 13, wherein the at least one first signal further comprises information regarding at least one of: a vehicle characteristic, driver of the electric vehicle, or a payment method expected to be used.

16. The method of claim 13, wherein the at least one second signal further comprises information regarding at least one of: a number of available charging stations, a charging station characteristic, a schedule of costs for charging, or a charging menu of options available for charging the electric vehicle using the available charging stations.

17. The method of claim 13, wherein the at least one charging station is configured to provide wireless power to the electric vehicle.

18. The method of claim 13, further comprising receiving at least one fourth signal from the electric vehicle via the first communication link, the at least one fourth signal indicative of the charging station identifier.

19. The method of claim 13, wherein the at least one charging station is configured to detect whether a non-electric vehicle is parked at the at least one charging station.

20. The method of claim 13, further comprising determining an optimal charging station of the at least one charging station to allocate to charging of the electric vehicle.

21. A communication system of an electric vehicle, the communication system comprising:

a transmitter configured to transmit at least one first signal to a charging system via a first communication link while the electric vehicle is a first distance from at least one charging station of a plurality of charging stations of the charging system, the at least one first signal indicative of a vehicle identifier of the electric vehicle, the charging system comprising a communication hub in communication with each charging station of the plurality of charging stations, the transmitter configured to transmit the at least one first signal to the communication hub; and at least one receiver configured to receive at least one second signal from the at least one charging station of the plurality of charging stations via a second communication link while the electric vehicle is a second distance from the at least one charging station, the second distance less than the first distance, the at least one second signal indicative of a charging station identifier of the at least one charging station, the at least one receiver further configured to receive at least one third signal from the communication hub via the first communication link, the at least one third signal comprising information regarding an identity of a charging station available for charging the electric vehicle.

22. The communication system of claim 21, wherein the at least one receiver comprises a first receiver configured to receive the at least one second signal from the at least one charging station of the plurality of charging stations via the second communication link and a second receiver configured to receive the at least one third signal from the communication hub via the first communication link.

23. The communication system of claim 22, further comprising a transceiver that comprises the transmitter and the second receiver, and the at least one third signal comprises information regarding an availability of one or more charging stations of the plurality of charging stations for use in charging the electric vehicle.

24. A charging system comprising:

a receiver configured to receive at least one first signal from an electric vehicle via a first communication link while the electric vehicle is a first distance from at least one charging station of the charging system, the at least one first signal indicative of a vehicle identifier of the electric vehicle;

a plurality of charging stations comprising the at least one charging station, the plurality of charging stations configured to wirelessly charge the electric vehicle, each charging station of the plurality of charging stations comprising a first transmitter configured to transmit at least one second signal via a second communication link while the electric vehicle is a second distance from the at least one charging station, the second distance less than the first distance, the at least one second signal indicative of an identifier of the at least one charging station of the plurality of charging stations; and a communication hub in communication with each charging station of the plurality of charging stations, the communication hub comprising the receiver and a second transmitter configured to transmit at least one third signal to the electric vehicle via the first communication link, the at least one third signal comprising information regarding an identity of a charging station available for charging the electric vehicle.

25. The charging system of claim 24, wherein the at least one charging station is configured to detect whether a non-electric vehicle is parked at the at least one charging station.

* * * * *